(12) United States Patent
Burton et al.

(10) Patent No.: US 12,263,431 B2
(45) Date of Patent: Apr. 1, 2025

(54) AIR CLEANER ASSEMBLIES

(71) Applicant: DONALDSON COMPANY, INC., Minneapolis, MN (US)

(72) Inventors: David J. Burton, Bloomington, MN (US); Hubert J. Rahn, Rosemount, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 18/502,949

(22) Filed: Nov. 6, 2023

(65) Prior Publication Data
US 2024/0066452 A1 Feb. 29, 2024

Related U.S. Application Data

(60) Continuation of application No. 17/671,846, filed on Feb. 15, 2022, now Pat. No. 11,833,463, which is a
(Continued)

(51) Int. Cl.
*B01D 46/42* (2006.01)
*B01D 45/14* (2006.01)
(Continued)

(52) U.S. Cl.
CPC ......... *B01D 46/0005* (2013.01); *B01D 45/14* (2013.01); *B01D 46/4227* (2013.01);
(Continued)

(58) Field of Classification Search
CPC ...... B01D 46/525–527; B01D 46/0005; B01D 46/4227
See application file for complete search history.

(56) References Cited

U.S. PATENT DOCUMENTS

| 4,407,664 A | 10/1983 | Sillers, Jr. |
| 4,925,561 A | 5/1990 | Ishii et al. |

(Continued)

FOREIGN PATENT DOCUMENTS

| CN | 1115357 A | 1/1996 |
| CN | 1921922 A | 6/1996 |

(Continued)

OTHER PUBLICATIONS

Extended European Search Report for co-pending European Application No. 23191721.2, dated Oct. 19, 2023, 9 pp.
(Continued)

*Primary Examiner* — Robert Clemente
(74) *Attorney, Agent, or Firm* — Kagan Binder, PLLC

(57) ABSTRACT

An air cleaner assembly including a housing, a filter cartridge removably positioned within the inner opening of the housing, wherein the filter cartridge includes a media pack and a sealing member that includes a pinch seal portion spaced from an outer surface of the media pack and positionable within a housing channel of the housing when the filter cartridge is positioned within the inner opening of the housing, and a precleaner assembly positionable between the filter cartridge and the inlet end of the housing, wherein the precleaner includes a base member having a lower edge, and an access cover removably attachable to an inlet end of the housing, wherein the precleaner assembly is sealable within the air cleaner assembly by pressing the lower edge of the base member against a top surface of the sealing member.

15 Claims, 11 Drawing Sheets

Related U.S. Application Data division of application No. 16/833,795, filed on Mar. 30, 2020, now Pat. No. 11,260,331, which is a continuation of application No. 15/629,253, filed on Jun. 21, 2017, now Pat. No. 10,610,815.

(60) Provisional application No. 62/358,932, filed on Jul. 6, 2016.

(51) Int. Cl.
| | | |
|---|---|---|
| *B01D 46/00* | (2022.01) | |
| *B01D 46/52* | (2006.01) | |
| *B01D 46/64* | (2022.01) | |
| *B01D 50/20* | (2022.01) | |
| *F02M 35/02* | (2006.01) | |
| *F02M 35/024* | (2006.01) | |

(52) U.S. Cl.
CPC ......... *B01D 46/521* (2013.01); *B01D 46/527* (2013.01); *B01D 46/64* (2022.01); *B01D 50/20* (2022.01); *B01D 2271/02* (2013.01); *B01D 2271/022* (2013.01); *B01D 2279/60* (2013.01); *F02M 35/0201* (2013.01); *F02M 35/0216* (2013.01); *F02M 35/02416* (2013.01)

(56) References Cited

U.S. PATENT DOCUMENTS

| | | | |
|---|---|---|---|
| 5,000,768 | A | 3/1991 | Hwang |
| 5,049,326 | A | 9/1991 | Matsumoto et al. |
| 5,562,825 | A | 10/1996 | Yamada et al. |
| 5,569,311 | A | 10/1996 | Oda et al. |
| 5,772,883 | A | 6/1998 | Rothman et al. |
| D396,098 | S | 7/1998 | Gilllingham et al. |
| 5,792,247 | A | 8/1998 | Gillingham et al. |
| D398,046 | S | 9/1998 | Gillingham et al. |
| D399,944 | S | 10/1998 | Gillingham et al. |
| 5,820,646 | A | 10/1998 | Gillingham et al. |
| 5,895,574 | A | 4/1999 | Friedmann et al. |
| 5,902,364 | A | 5/1999 | Tokar et al. |
| D428,128 | S | 7/2000 | Gillingham et al. |
| 6,179,890 | B1 | 1/2001 | Ramos et al. |
| D437,401 | S | 2/2001 | Ramos et al. |
| 6,190,432 | B1 | 2/2001 | Gieseke et al. |
| 6,210,469 | B1 | 4/2001 | Tokar |
| 6,235,195 | B1 | 5/2001 | Tokar |
| 6,350,296 | B1 | 2/2002 | Warner |
| 6,673,136 | B2 | 1/2004 | Gillingham et al. |
| 7,713,321 | B2 | 5/2010 | Kuempel et al. |
| 8,916,044 | B2 | 12/2014 | Rapin |
| 8,961,722 | B2 | 2/2015 | Schrage et al. |
| 10,610,815 | B2 | 4/2020 | Burton et al. |
| 11,260,331 | B2 | 3/2022 | Burton et al. |
| 11,833,463 | B2 | 12/2023 | Burton et al. |
| 2007/0006560 | A1 | 1/2007 | Ruhland et al. |
| 2007/0039296 | A1 | 2/2007 | Schrage et al. |
| 2007/0289265 | A1 | 12/2007 | Coulonvaux et al. |
| 2011/0197556 | A1* | 8/2011 | Brown ............... F02M 35/0245 55/498 |
| 2014/0208705 | A1 | 7/2014 | Krull |
| 2015/0068174 | A1 | 3/2015 | Krisko et al. |
| 2015/0231547 | A1 | 8/2015 | Scrage et al. |
| 2016/0045848 | A1 | 2/2016 | Campbell et al. |

FOREIGN PATENT DOCUMENTS

| | | | |
|---|---|---|---|
| CN | 1225032 | A | 8/1999 |
| CN | 2611012 | Y | 4/2004 |
| CN | 101563144 | A | 10/2009 |
| CN | 101909719 | A | 12/2010 |
| CN | 201771639 | U | 3/2011 |
| EP | 1213470 | A2 | 12/2002 |
| WO | 9740918 | A1 | 11/1997 |
| WO | 2004007054 | A1 | 1/2004 |
| WO | 2004082795 | A3 | 9/2004 |
| WO | 2005077487 | A1 | 8/2005 |
| WO | 2005094665 | A2 | 10/2005 |
| WO | 2009014988 | A1 | 1/2009 |
| WO | 2009/064894 | A1 | 5/2009 |
| WO | 2010011628 | A2 | 1/2010 |
| WO | 2014210541 | A1 | 12/2014 |
| WO | 2016014549 | A1 | 1/2016 |
| WO | 2016105560 | A2 | 6/2016 |

OTHER PUBLICATIONS

U.S. Appl. No. 62/097,060, filed Dec. 27, 2014, titled "Filter Cartridges; Air Cleaner Assemblies; Housings; Features; Components; And, Methods".

U.S. Appl. No. 62/077,749, filed Nov. 10, 2014, titled, "Filtration Media, Filter Elements, and Methods".

International Search Report for co-pending PCT/US2017/038556, 7 pages, Dec. 12, 2017.

Chinese Search Report with English Translation for co-pending CN 201780041415.5, 5 pages, Oct. 13, 2020.

Japanese Office Action for co-pending JP2022-052414, 3 pages, Apr. 14, 2023.

Extended European Search Report for co-pending EP21189768.1, 9 pages, Jan. 25, 2022.

* cited by examiner

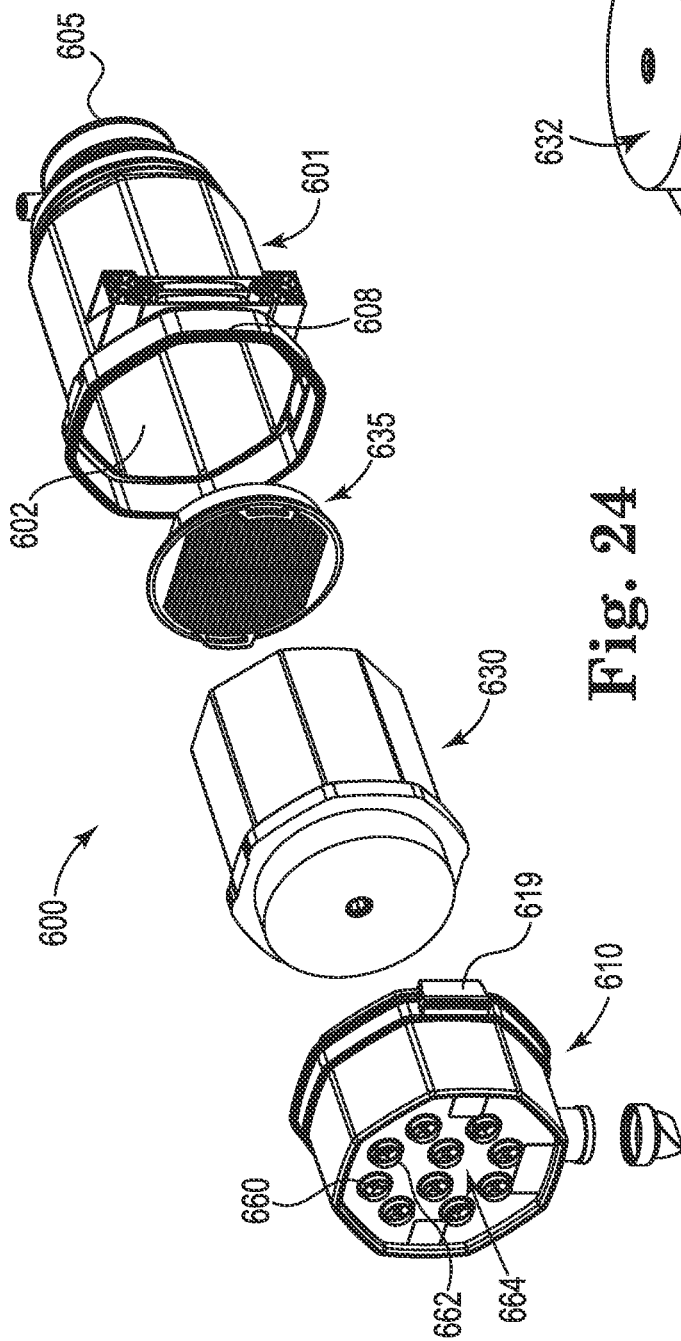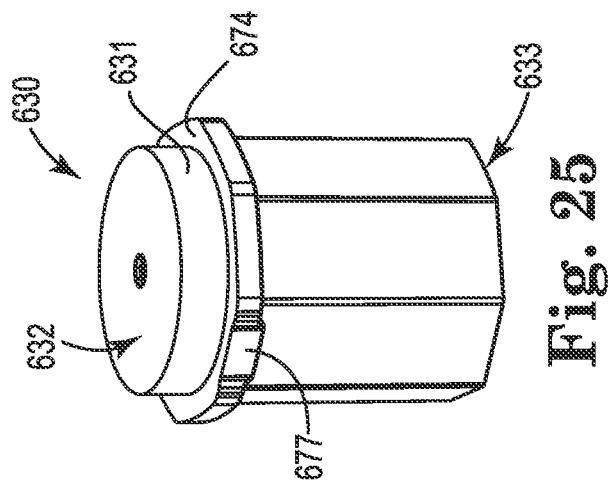

AIR CLEANER ASSEMBLIES

CROSS-REFERENCE TO RELATED APPLICATIONS

This application is a continuation application of U.S. patent application Ser. No. 17/671,846, filed Feb. 15, 2022, now allowed, which is a divisional application of U.S. Pat. No. 11,260,331, issued Mar. 1, 2022, which is a continuation application of U.S. Pat. No. 10,610,815, issued Apr. 7, 2020, which claims the benefit of U.S. Provisional Patent Application No. 62/358,932 filed Jul. 6, 2016, the entire contents of which are incorporated herein by reference in their entireties.

TECHNICAL FIELD

The present invention relates to filter arrangements, typically for use in filtering air, such as intake air for internal combustion engines, and more particularly relates to filter assemblies that include multiple components arranged in a housing to provide desired filtering capabilities.

BACKGROUND

Air streams can carry contaminant material such as dust and other particulates. For example, air flow streams being provided to engines for construction equipment, motorized vehicles, power generation equipment, combustion furnaces, and the like can carry particulate contaminant therein that can damage and/or negatively impact the performance of such equipment. In many instances, it is necessary and/or desired to filter some or all of the incoming contaminant material from the air stream. A large number of air filter arrangements have been developed for contaminant removal and are often particularly designed to cooperate within certain spaces within or adjacent to the equipment. However, there is a continuous need to improve the effectiveness and efficiency of the air filtration equipment.

SUMMARY

In one aspect of the invention, a filter cartridge is provided that is configured to be removably positionable within an inner opening of a housing. The filter cartridge includes a media pack with an inlet end, an outlet end, and an outer surface having an outer peripheral shape, and at least one of: (a) a frame member at least partially surrounding the media pack, the frame member comprising a frame wall having a shape that is different from the outer perimeter shape of the media pack; and (b) a shell at least partially surrounding the media pack, the shell comprising a shell wall having a shape that is different from the outer perimeter shape of the media pack. The cartridge further includes a sealing member extending at least partially around the inlet end of the media pack, wherein the sealing member comprises a pinch seal portion that is spaced from the outer surface of the media pack. The filter cartridge can be used in combination with a housing comprising an inlet end, an outlet end, and an inner opening between the inlet and outlet ends defined by a housing wall having an inner peripheral shape. At least one of the shell wall and the frame wall can have an outer shape that generally matches the inner peripheral shape of the housing wall. When a frame member is provided, it can include an inner opening at least partially defined by an upper lip extending inwardly from the frame wall at its upper edge in at least one location across a gap located between the frame wall and the outer surface of the media pack when the media pack is positioned at least partially within the inner opening of the frame member. The frame member can also include a handle and/or at least one notch extending along at least a portion of the height of the frame wall and/or at least one projection or stand-off extending from the bottom edge of the frame wall.

In another aspect of the invention, an air cleaner assembly is provided that includes a housing comprising an inlet end, an outlet end, an inner opening between the inlet and outlet ends defined by a housing wall having an inner surface, a filter cartridge removably positioned within the inner opening of the housing. The filter cartridge includes a media pack having an inlet end, an opposite outlet end, and an outer surface, and a sealing member secured to an inlet end of the media pack, wherein the sealing member comprises a pinch seal portion that is spaced from the outer surface of the media pack, and wherein the sealing portion is positionable within the channel of the housing when the filter cartridge is positioned within the inner opening of the housing. The assembly further includes a precleaner assembly positionable between the filter cartridge and the inlet end of the housing, the precleaner including a base member comprising a lower edge, and an access cover that is removably attachable to the inlet end of the housing, wherein the precleaner assembly is sealable within the air cleaner assembly by pressing the lower edge of the base member against a top surface of the sealing member and pressing the gasket of the access cover against the inlet end of the housing.

In another aspect of the invention, an air cleaner assembly is provided that includes a housing comprising an inlet end, an outlet end, and an inner opening between the inlet and outlet ends; and a precleaner assembly at an inlet end of the housing. The precleaner assembly includes a precleaner main body, an access cover removably attachable to the inlet end of the housing, and a plurality of contaminant separator tubes extending in a first direction from the access cover in a flow tube arrangement, wherein the flow tube arrangement comprises multiple pairs of tubes arranged in rows that are spaced from each other along a length of the access cover, wherein the tubes of each row are offset from the tubes of each adjacent row. The access cover may be removably mounted on the housing over the inlet end and with the contaminant separator tubes projecting toward the outlet end of the housing. In addition, the contaminant separator tubes can include an ejection slot positioned between its inlet end and outlet end, wherein each of the ejection slots is rotationally positionable for directional movement of contaminant from the precleaner assembly. In one configuration, a first plurality of contaminant separator tubes are rotationally positioned with their ejection slots facing in a first direction, and a second plurality of contaminant separator tubes are rotationally positioned with their ejection slots facing in a second direction that is different from the first direction.

BRIEF DESCRIPTION OF THE DRAWINGS

The present invention will be further explained with reference to the appended Figures, wherein like structure is referred to by like numerals throughout the several views, and wherein;

FIG. 24 is an exploded perspective view of an exemplary embodiment of an air cleaner assembly of the invention; and FIG. 25 is a perspective view of a filter cartridge for use in an air cleaner assembly of the type illustrated in FIG. 24.

DETAILED DESCRIPTION

Figure 1:
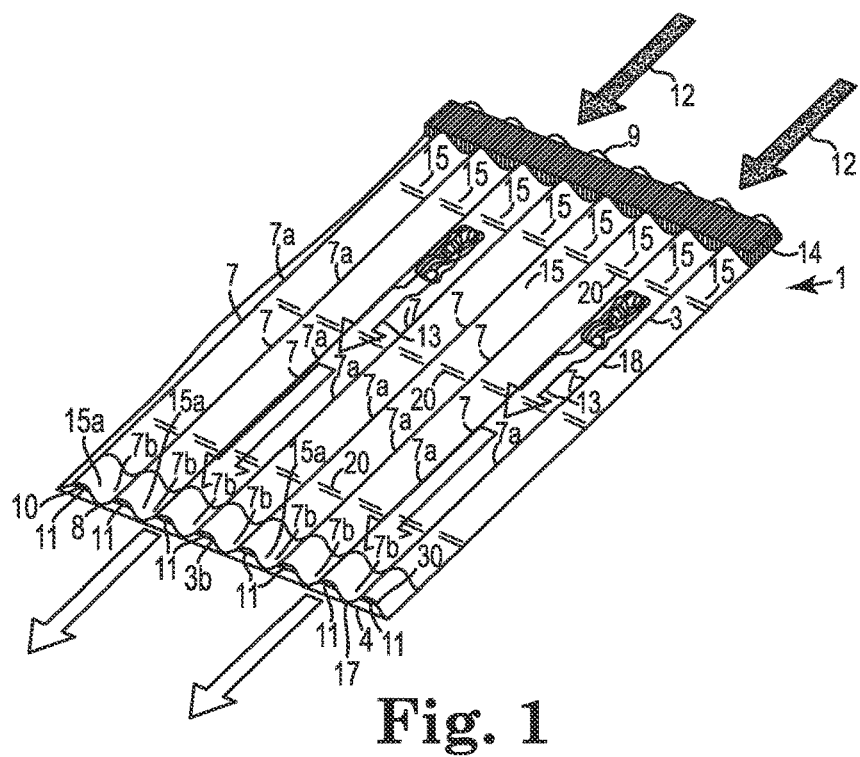
FIG. 1 is a perspective view of an exemplary media type useable in air cleaner assemblies of the invention.
Figure 2:
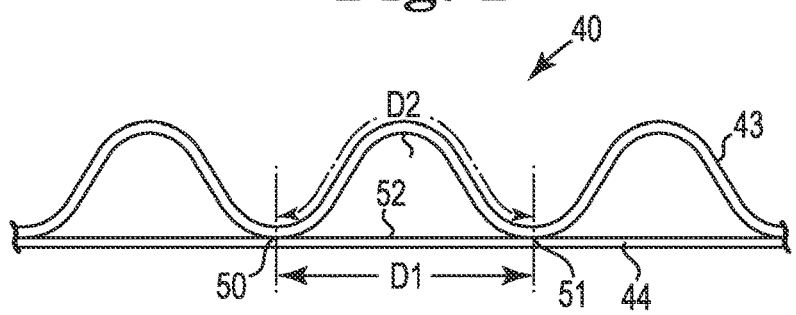
FIG. 2 is an enlarged cross-sectional view of a portion of the media type illustrated in FIG. 1.

Referring now to the Figures, wherein the components are labeled with like numerals throughout the several Figures, and initially to FIGS. 1-2, an exemplary configuration is illustrated of fluted filter media that can be used in embodiments of filter systems of the invention. In particular, fluted filter media (also known as media having media ridges) can be used to provide fluid filter constructions in a variety of manners. One well known manner is characterized herein as a z-filter construction. The term "z-filter construction" as used herein, is meant to refer to a type of filter construction in which individual ones of corrugated, folded or otherwise formed filter flutes are used to define sets of longitudinal, typically parallel, inlet and outlet filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; D399,944; D428,128; D396,098; D398,046; and D437,401, each of which is incorporated herein by reference.

One type of z-filter media utilizes two specific media components joined together to form the media construction. The two components include a fluted (typically corrugated) media sheet and a facing media sheet. The facing media sheet is typically non-corrugated, although it is possible for it to also be corrugated (e.g., perpendicular to the flute direction) as described in U.S. Provisional Application No. 60/543,804, filed Feb. 11, 2004, and published as PCT WO 05/077487 on Aug. 25, 2005, which is incorporated herein by reference.

The fluted media sheet and the facing media sheet are used together to define media having parallel inlet and outlet flutes. In some instances, the fluted sheet and facing sheet are secured together and are then coiled as a media strip to form a z-filter media construction. Such arrangements are described, for example, in U.S. Pat. Nos. 6,235,195 and 6,179,890, each of which is incorporated herein by reference. In certain other arrangements, some non-coiled sections or strips of fluted (typically corrugated) media secured to facing media, are stacked with one another, to create a filter construction.

Corrugated media is a specific form of fluted media, wherein fluted media has individual flutes or ridges (for example formed by corrugating or folding) extending thereacross. The term "corrugated" is used herein to refer to structure in media, such as media having a flute structure resulting from passing the media between two corrugation rollers (e.g., into a nip or bite between two rollers, each of which has surface features appropriate to cause corrugations in the resulting media).

Serviceable filter element or filter cartridge configurations utilizing z-filter media are sometimes referred to as "straight through flow configurations" or by variants thereof. In general, serviceable filter elements or cartridges have an inlet flow end (or face) and an opposite exit flow end (or face), with flow entering and exiting the filter cartridge in generally the same straight through direction. The term "serviceable" in this context is meant to refer to a media containing filter cartridge that is periodically removed and replaced from a corresponding fluid (e.g. air) cleaner.

FIG. 1 illustrates exemplary media 1 useable in z-filter media constructions for filter systems of the invention. The term "z-filter media construction" is generally meant to refer to a web of corrugated or otherwise fluted media secured to or facing media with appropriate sealing to allow for definition of inlet and outlet flutes, and/or a media pack constructed or formed from such media into a three dimensional network of inlet and outlet flutes; and/or, a filter cartridge or construction including such a media pack. The media 1 is formed from a fluted or ridged sheet 3 and a facing sheet 4. A construction such as media 1 is referred to herein as a single facer or single faced strip.

In general, the corrugated fluted or ridged sheet 3 is of a type characterized herein as having a regular, curved, wave pattern of flutes, ridges or corrugations 7 arranged in a pattern of alternating troughs 7b and ridges 7a, wherein each trough 7b is substantially an inverse ridge for each ridge 7a. In general, the corrugation pattern is not the result of a folded or creased shape provided to the media, but rather the apex 7a of each ridge and the bottom 7b of each trough can be formed along a radiused curve. An exemplary radius for such z-filter media would be between 0.25 mm and 3 mm.

With continued reference to FIG. 1, the media 1 has first and second opposite edges 8 and 9. When the media 1 is formed into a media pack, edge 9 will generally provide an inlet end or face for the media pack, and edge 8 will provide an outlet end or face, although an opposite orientation is possible. Adjacent edge 8 may be provided with a sealant bead 10 that seals the corrugated sheet 3 and the facing sheet 4 together. Such a sealant bead 10 seals closed individual flutes 11 adjacent edge 8 to passage of air.

Another seal bead 14 can be provided adjacent to edge 9, which generally closes flutes 15 to passage of unfiltered material. Bead 14 can be applied as media 1 is configured into a media pack. If the media pack is made from a stack of strips, for one example, bead 14 will form a seal between a back side 17 of facing sheet 4, and side 18 of the next adjacent corrugated sheet 3.

Once the filter media 1 is incorporated into a media pack, such as by stacking or coiling, it can be utilized as follows. First, air in the direction of arrows 12 can enter open flutes 11 adjacent end 8. Due to the closure at end 8 by bead 10, the air can pass through the filter media 1, such as is shown by arrows 13. It could then exit the media or media pack by passage through open ends 15a of the flutes 15 adjacent end 8 of the media pack. Operation can instead occur with air flow in the opposite direction.

For the exemplary arrangement illustrated in FIG. 1, the corrugations 7a, 7b extend generally straight along the media from edge 8 to edge 9. Straight flutes, ridges or corrugations can be deformed or folded at selected locations, such as at the ends. Modifications at flute ends for closure are generally disregarded in the above definitions of "regular," "curved" and "wave pattern."

Z-filter constructions which do not utilize straight, regular curved wave pattern corrugation shapes can also be used in the assemblies of the invention. For several examples, U.S. Pat. No. 5,562,825 (Yamada et al.) provides for corrugation patterns that utilize somewhat semicircular (in cross section) inlet flutes adjacent narrow V-shaped (with curved sides) exit flutes; U.S. Pat. No. 5,049,326 (Matsumoto, et al.) provides for circular (in cross-section) or tubular flutes defined by one sheet having half tubes attached to another sheet having half tubes, with flat regions between the resulting parallel, straight flutes; U.S. Pat. No. 4,925,561 (Ishii, et al.) provides for flutes folded to have a rectangular cross section and that taper along their lengths; WO 97/40918 provides for flutes or parallel corrugations that have curved wave patterns (from adjacent curved convex and concave troughs) but that taper along their lengths; and WO 97/40918 provides for flutes that have curved wave patterns, but with different sized ridges and troughs. Each of these references is incorporated herein by reference in its entirety. Also, flutes that are modified in shape to include various ridges can be utilized in assemblies of the invention.

In general, the filter media used is a relatively flexible material, such as a non-woven fibrous material (of cellulose fibers, synthetic fibers or both) that can include a resin therein, sometimes treated with additional materials. Thus, it can be conformed or configured into the various corrugated patterns, without unacceptable media damage. Also, it can be readily coiled or otherwise configured for use without unacceptable media damage. The media will generally be of a nature such that it will maintain the required corrugated configuration during use.

During the corrugation process, the media can be inelastically formed such that it is prevented from returning to its original shape. However, once the tension is released, the flute or corrugations may still tend to spring back slightly, recovering only a portion of the stretch and bending that has occurred. Therefore, the facing media sheet is sometimes tacked to the fluted media sheet to inhibit this spring back in the corrugated sheet, such as at the location designated by reference numeral. The media of the corrugated (fluted) sheet 3 and/or facing sheet 4 can also be provided with a fine fiber material on one or both sides thereof, for example in accordance with U.S. Pat. No. 6,673,136, which is incorporated herein by reference. In some instances when such fine fiber material is used, it may be desirable to provide the fine fiber on the upstream side of the material and inside the flutes. When this occurs, air flow will typically be into the edge comprising the tacking bead.

FIG. 2 illustrates an exemplary configuration of a z-filter media construction 40, which includes a regular, curved, wave pattern corrugated sheet 43, and a non-corrugated flat sheet 44. A distance D1 between points 50 and 51 defines the extension of flat media 44 in region 52 underneath a given corrugated flute 53. The length D2 of the arcuate media for the corrugated flute 53 over the same distance D1 is larger than D1 due to the shape of the corrugated flute 30. For an exemplary regular shaped media used in fluted filter applications, the linear length D2 of the media 53 between points 50 and 51 can be at least 1.2 times D1, such as in a range of 1.2-2.0 times D1. In a particular exemplary air filter configuration, D2 is about 1.25-1.35 times D1. Such media has been used commercially in Z-filter arrangements, such as those sold commercially by Donaldson under the trade designation "Powercore," for example. Another media variation comprising fluted media with facing media secured thereto can be used in arrangements according to the present invention, such as is described in U.S. Patent Publication No. 2014/0208705, owned by Baldwin Filters, Inc. and published Jul. 31, 2014, the disclosure of which is incorporated herein by reference.

Coiled media or media pack arrangements can be provided with a variety of outer perimeter shapes, such as circular, obround, and oval, wherein some oval shapes have opposite curved ends attached by a pair of opposite sides that are also curved. In other oval shapes, sometimes called racetrack shapes, the opposite sides between opposite curved ends are generally straight. Racetrack shapes are described for example in PCT WO 04/007054, and PCT application US 04/07927, published as WO 04/082795, each of which is incorporated herein by reference.

Figure 3:
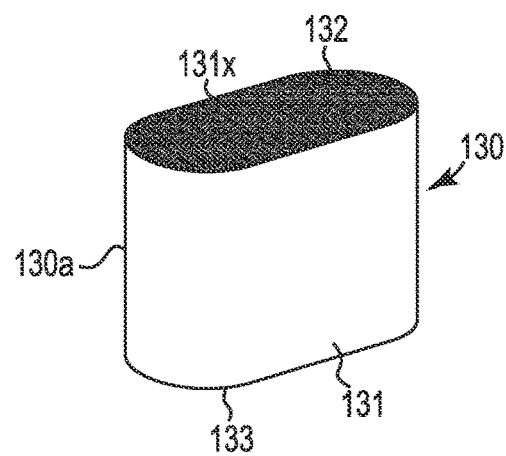
FIG. 3 is a perspective view of a coiled filter arrangement usable in a filter cartridge according to the present invention, which can include media of the type illustrated in FIG. 1.

FIG. 3 illustrates an exemplary coiled media pack (also referred to as coiled media) 130 constructed by coiling a single strip of single faced media. The particular coiled media pack depicted is an oval media pack 130a, which may be more specifically referred to as a racetrack shaped media pack 131. The tail end 131x of the media is shown at the outside of the media pack 130. A hot melt seal bead or seal bead can be positioned along that tail end to ensure sealing. In the media pack 130, the opposite flow (end) faces are designated at 132, 133. Additional media types can be used in filter arrangements of the invention, wherein the media is typically stacked or coiled into an arrangement that includes opposite inlet and outlet flow ends or faces, such as media described in U.S. Patent Application Ser. No. 62/077,749, filed Nov. 10, 2014 and owned by the Assignee of the present disclosure, for example.

Many of the techniques characterized herein will used with media that is oriented for filtering between opposite flow ends of the cartridge, such as media having flutes or pleat tips that extend in a direction between those opposite ends. However, techniques characterized herein with respect to seal arrangement definitions can be applied in other filter cartridges that have opposite flow ends, with media positioned to filter fluid flow between those ends, even when the media does not include flutes or pleat tips extending in a direction between those ends. The media, for example, can be depth media, can be pleated in an alternate direction, or it can be a non-pleated material.

Figure 4:
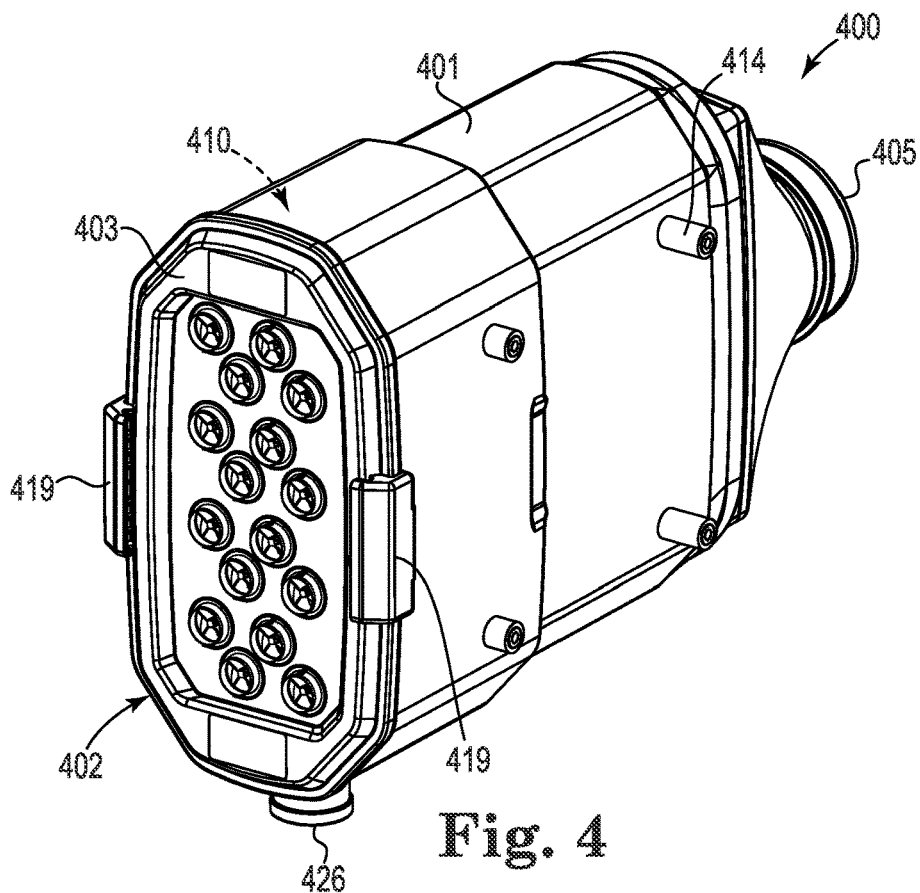
FIG. 4 is a perspective view of an air cleaner assembly according to the present invention, the view facing generally toward an inlet end of the air cleaner assembly.
Figure 5:
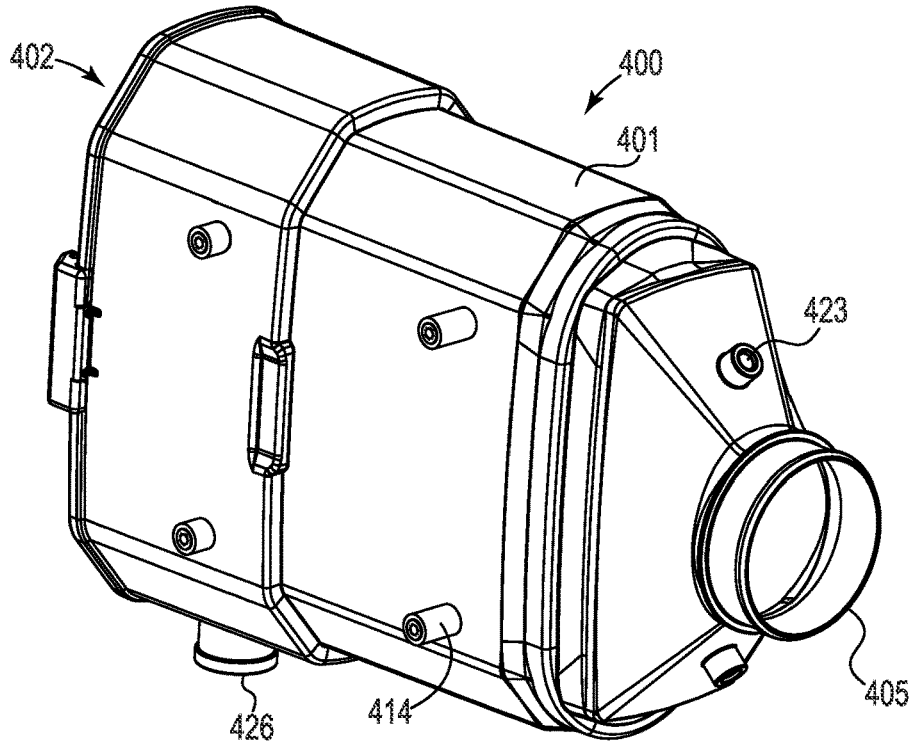
FIG. 5 is another perspective view of the air cleaner assembly of FIG. 4, the view facing generally toward an outlet end of the air cleaner assembly.

FIGS. 4-20 illustrate exemplary embodiments of an air cleaner assembly in accordance with the invention, which can include filter cartridges having media and/or a media pack, as previously discussed relative to FIGS. 1-3, or other appropriate media. Referring first to FIGS. 4 and 5, different views are illustrated of an exemplary air cleaner assembly 400 according to the present invention, which assembly generally includes a housing 401 with a removable access cover 403 that provides access to the inner area of the housing, such as for placement and removal of filter cartridges. The air cleaner assembly 400 further includes an outlet 405 that is positioned for exit of filtered air. The outlet 405 can be made separately from the housing 401 and attached thereto, or it can be integrally constructed as a portion of the housing 401. The outlet 405 can be provided as a separate component in assemblies where it may be desired to allow for a selection of different outlet configurations. The housing 401 further includes an air inlet end 402 through which air to be filtered enters the assembly 400.

The housing 401 can be constructed using a variety of materials or combinations of materials, and using a number of different construction techniques. In one exemplary embodiment, the housing 401 is a molded plastic component, which can include optional ribbing members extending from its outer surface to provide structural strength to the housing 401 and/or for aesthetic purposes. Thus, when optional ribbing is provided, it can have a wide variety of configurations to meet the desired function of the ribbing, including different shapes, sizes, and quantities.

The particular air cleaner assembly 400 illustrated is a two-stage air cleaner assembly that includes a precleaner 410 adjacent to its inlet end. The general location and configuration of the precleaner 410 is shown in FIG. 4, while the components that make up the precleaner 410 are better illustrated in FIGS. 6 and 8, for example, and will be described in further detail below. The precleaner 410 generally is used to clean selected material or contaminants carried by an air stream into the air cleaner assembly 400 before the air reaches the filter cartridge positioned therein. Such precleaning can provide for substantial removal of liquid particulate such as rain water or splashed water, etc. and/or various dust or other particles (e.g., larger particles). In the illustrated example, the precleaner 410 includes the access cover 403 that is attachable to the housing 401. It is contemplated that the air cleaner assembly 400 may not include a precleaner, in an embodiment of the invention. In such a case, an access cover will be directly attachable to the housing 401 and provide direct access to the inner area of the housing 401 and any components contained therein.

In the illustrated embodiment, the access cover 403 is attachable to and removable from the housing 401 by connecting and disconnecting multiple connectors or latches 419 that are moveably attached to the access cover 403. In the illustrated embodiment, two latches 419 are symmetrically positioned on opposite edges of the access cover 403. However, it is understood that a different number and/or location for the latches 419 can be used, such as two latches on each edge of the access cover 403, a different number of latches on opposite edges of the access cover 403, or latches positioned in different location(s) around the perimeter of the access cover 403. It is further understood that alternate connector arrangements can be used instead of or in addition to latches 419, including bolts or other fasteners, for example.

The housing 401 further includes a mounting pad arrangement by which the air cleaner assembly 400 can be secured to equipment for use. The exemplary mounting pad arrangement illustrated in FIGS. 4 and 5 includes multiple mounting feet or pads 414 that extend from the outer surface of the housing 401. In this exemplary embodiment, the mounting feet 414 are configured for engagement with connectors, such as screws or other extending members that can engage with a central aperture of the feet. Although this embodiment is provided with four mounting feet or pads 414 on each side of the housing 401, a different number of feet or pads can instead be provided.

As can best be seen in FIG. 5, housing 401 further includes a utility port 423 adjacent to the outlet 405. The port 423 can be used for a restriction indicator or other equipment. In addition, a mass air flow sensor (MAFS) arrangement can optionally be mounted at the outlet 405 or in other ducting that is located further downstream.

With continued reference to FIGS. 4 and 5, housing 401 further includes an evacuation or outlet port 426 at its lower end or bottom area when the filter is positioned in this orientation. The port 426 is positioned for removal of particulate and/or water (i.e., contaminants) collected by the precleaner from the housing 401, and therefore may be referred to as an evacuation port. In an embodiment of the invention, this port 426 is oriented in a portion of the housing 401 that causes it to be directed downwardly in use. In many applications, the outlet port 426 will be directed downwardly in this way so that gravity can assist in material evacuation from the precleaner 410. However, if it is desired to mount the air cleaner assembly 400 differently than shown, such as along one of its sides, mounting structure(s) can be provided on that side, or the port 426 can be positioned at a different location relative to the housing body or in a portion of an access cover. In any of these arrangements, port 426 can be provided with an evacuator valve assembly therein, or it may be attached to a scavenge duct to facilitate removal of material from the precleaner 410.

Figure 6:
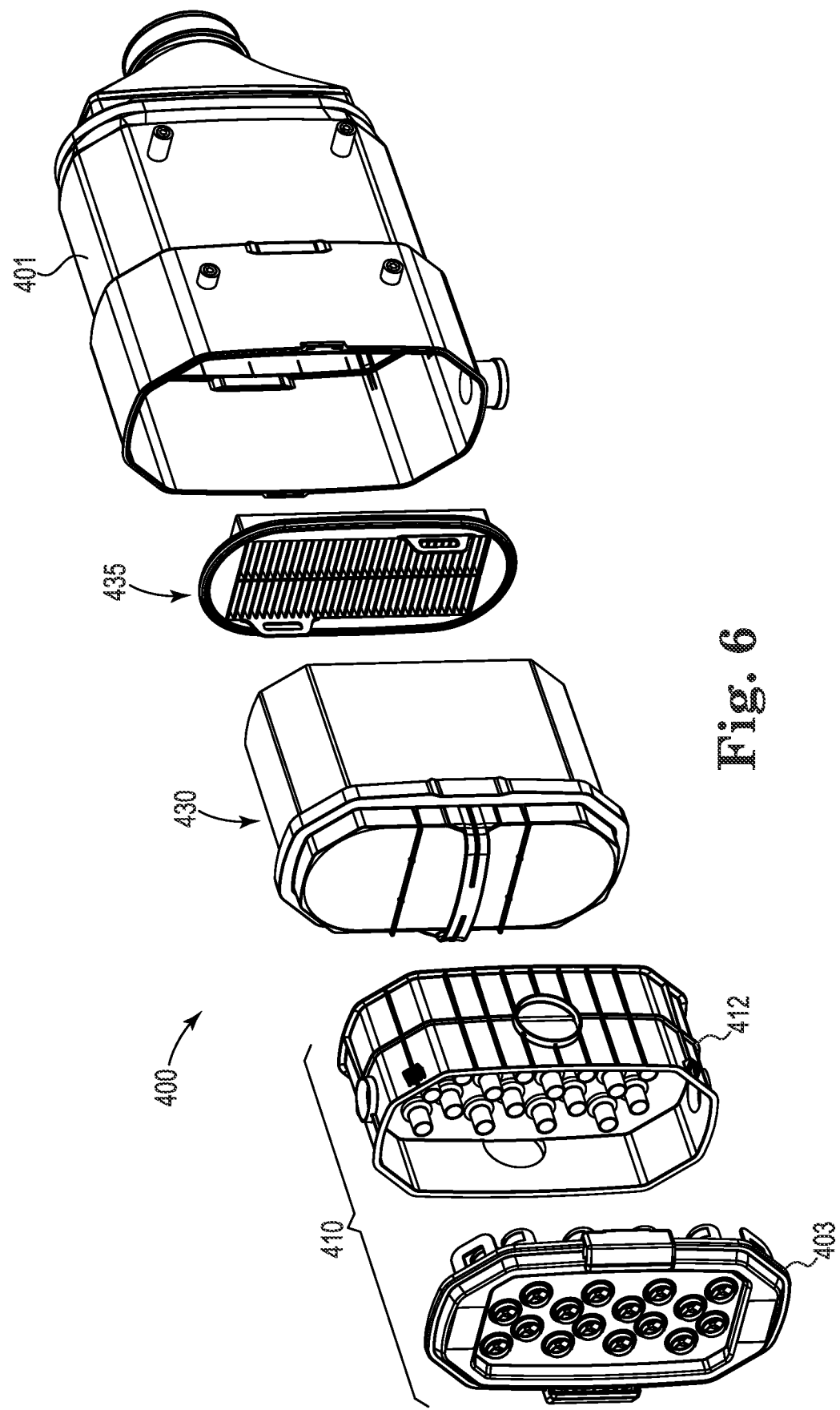
FIG. 6 is an exploded perspective view of the air cleaner assembly of FIG. 4.

Referring now to FIG. 6, an exploded perspective view of an exemplary embodiment of the air cleaner assembly 400 of the invention is illustrated, which generally includes a housing 401, a precleaner 410, a filter cartridge 430, and an optional safety filter 435, wherein these components and their relationships to each other are discussed in further detail below. Each of these components is illustrated in this exploded view of FIG. 6, in individual figures in the drawings, and also described above and/or below.

Figure 7:
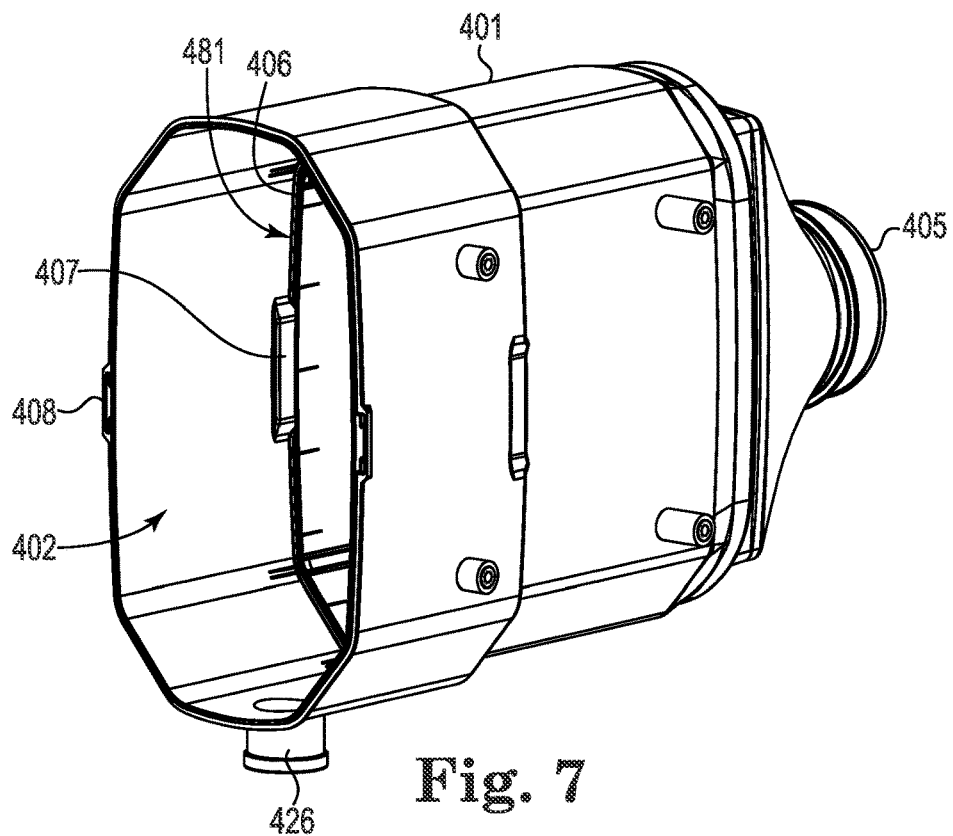
FIG. 7 is a perspective view of an air cleaner housing of the air cleaner assembly of FIG. 4.

One exemplary embodiment of housing 401 was discussed above with regard to the overall assembly shown in FIGS. 4 and 5; however, housing 401 is also shown in further detail in FIG. 7 without a corresponding air cleaner assembly 400 positioned therein. As shown, housing 401 includes the inlet 402 at an opposite end from the outlet 405, wherein the elements of the system are insertable into the inlet 402 for assembling the air cleaner assembly 400. Housing 401 further includes an inner lip 406 extending around the perimeter and spaced from the inlet 402, and at least one protrusion 407 extending inwardly from the wall of the housing 401. In addition, housing 401 includes at least one securing member 408 on the outside of its outer wall and adjacent to the inlet 402, which is provided for engagement with a latching mechanism 419 of the access cover 403. The inner lip 406 is positioned to provide one side of a channel or pocket 481, wherein the channel is also defined by the inner wall of the housing 401 and a bottom channel surface extending between the inner lip 406 and the inner wall of the housing 401. The channel 481 generally extends around the perimeter of the housing 401, as will be described in further detail below.

Figure 8:
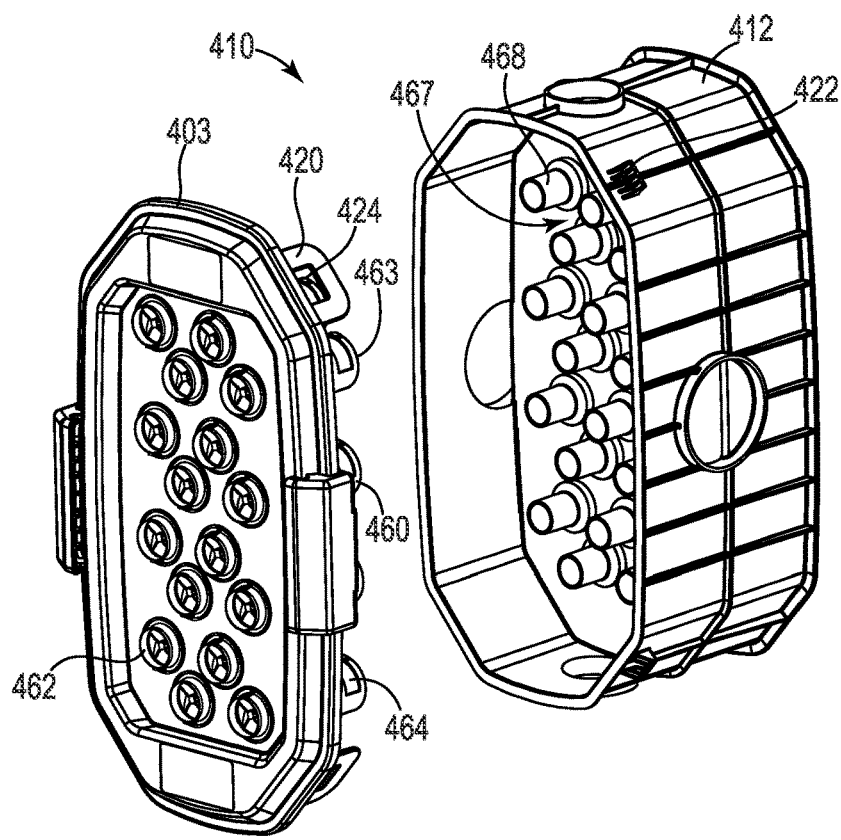
FIG. 8 is an exploded perspective view of a precleaner of the air cleaner assembly of FIG. 4.

The precleaner 410 illustrated in FIG. 6 is also illustrated in its exploded configuration in FIG. 8, and includes access cover 403 that is engageable with a base member 412 (along with being attachable to the housing 401 via latches). In embodiments of the air cleaner assembly 400, the access cover 403 can be engaged with the base member 412 via an attachment configuration, such as a snap-fit arrangement, to secure the two parts to each other as a single unit that is then attachable to the housing 401 via latches 419. In this embodiment, the access cover 403 of the precleaner 410 is also separable from the base member 412 to facilitate cleaning, for example. However, in another embodiment of the precleaner 410, the access cover 403 is secured permanently to base member 412 or molded as a single piece that is provided to the assembly 400 as a single unit. In any case, the precleaner 410 is generally used to remove a portion of the dust or other particulate material (e.g., liquid particulate material) that enters the air cleaner through the air flow inlet before that material can reach internally positioned filter cartridge 430. The precleaner 410 can thereby help extend the lifetime of operation of the assembly without servicing, as well as protect the filter cartridge against damage.

In one exemplary embodiment, the base member 412 of precleaner 410 is secured to the access cover 403 by engagement of at least one tab member 420, which extends from an edge of the access cover 403, with an engagement member 422 that is located on the outside of the base member 412. Alternatively, the tab member(s) and other features may extend from the base member 412 while the engagement member(s) extend from the access cover 403. In the illustrated embodiment, the tab members 420 each include an aperture 424 that is sized and shaped to accept at least a portion of a corresponding engagement member 422 simply by pushing the access cover 403 and base member 412 toward each other with the tab members 420 sliding over the top of corresponding engagement members 422 until the apertures 424 are engaged with the engagement members 422. It is contemplated, however, that a number of different configurations and features can be used to secure the components of the precleaner 410 to each other.

Figure 9:
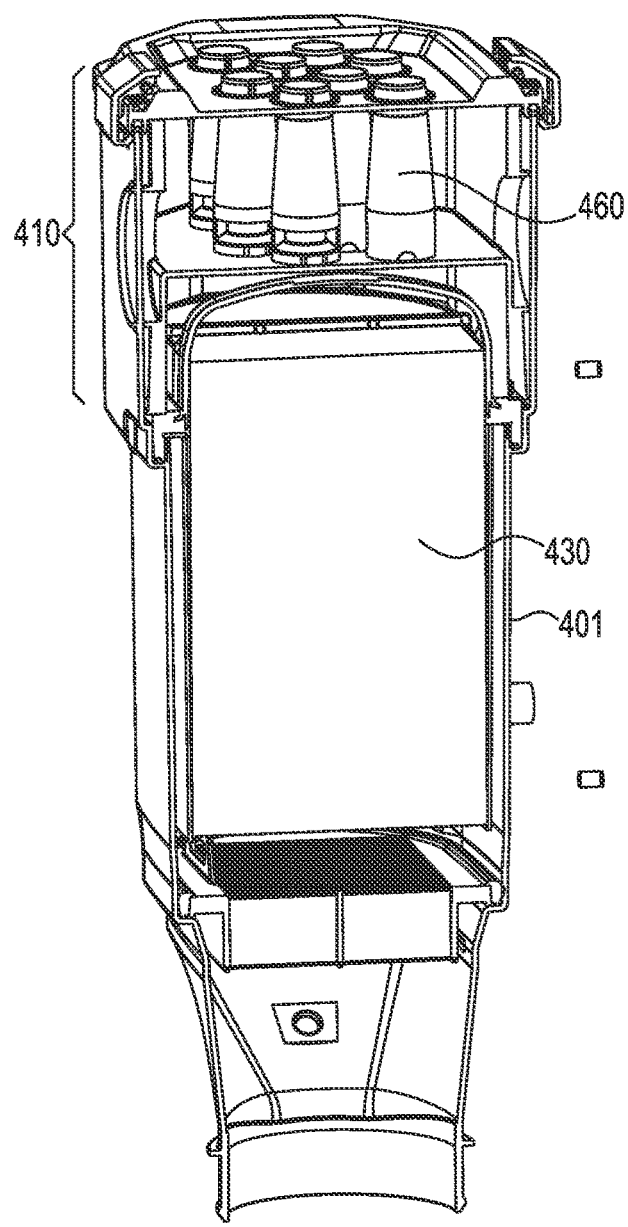
FIG. 9 is a perspective cross-sectional view of the air cleaner assembly of FIG. 4, including a precleaner.
Figure 10:
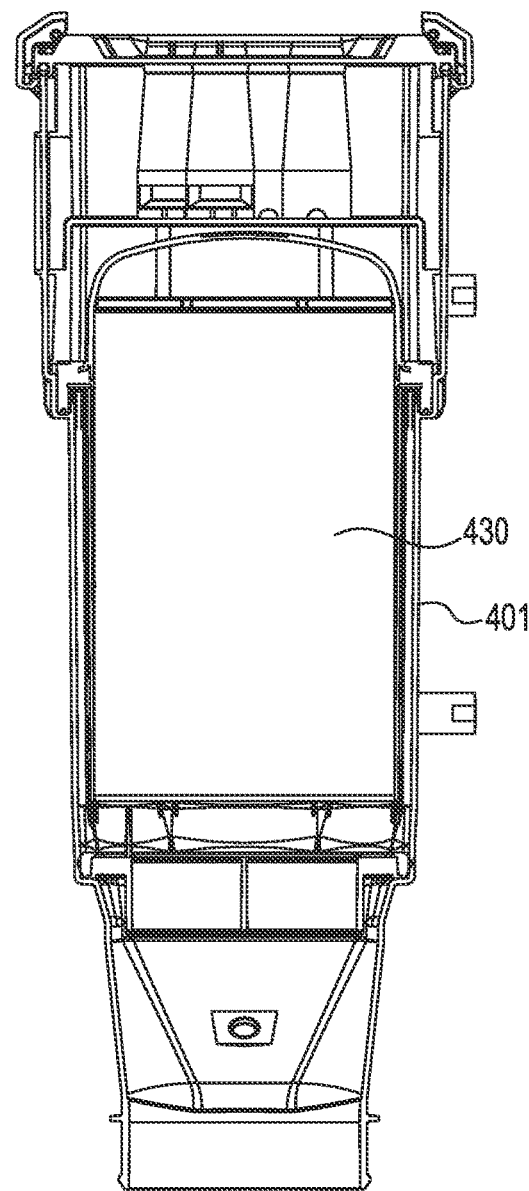
FIG. 10 is a cross-sectional view of the air cleaner assembly of FIG. 4, the perspective cross-sectional view of which is illustrated in FIG. 9.
Figure 11:
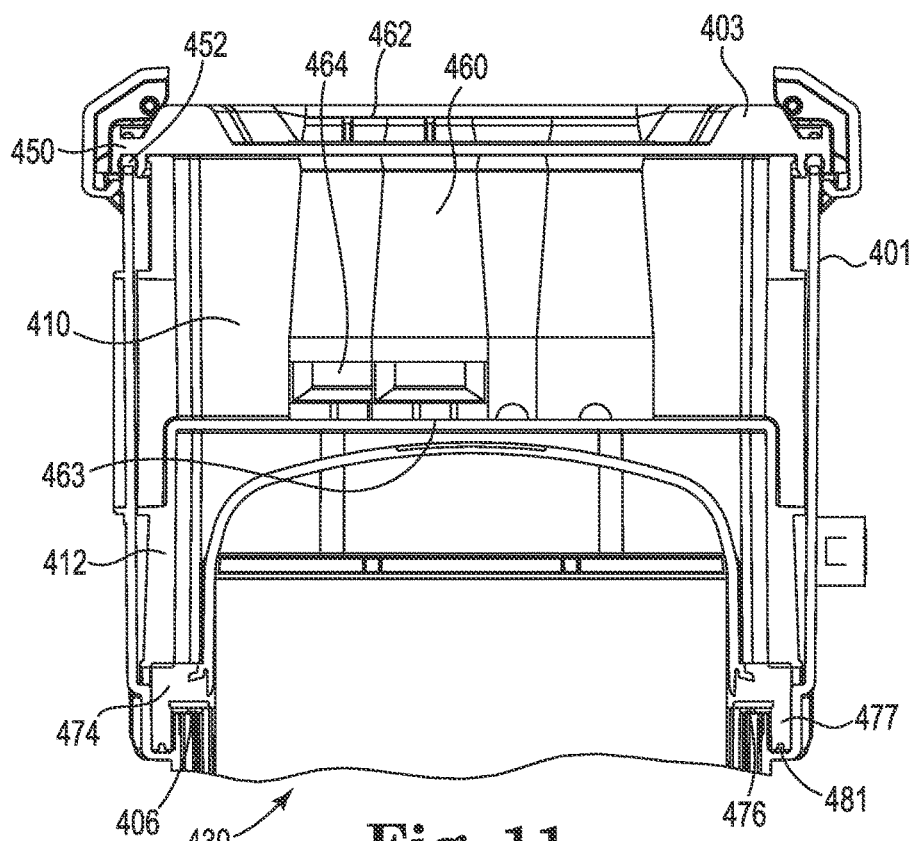
FIG. 11 is an enlarged cross-sectional view of a portion of the air cleaner illustrated in FIG. 10.

FIGS. 9-11 provide various views of the precleaner 410 as it is assembled and positioned within a housing 401. The access cover 403 includes a perimeter mounting flange 450, which is aligned within the end of the housing 401 during installation. A seal member or gasket 452, which may be an O-ring seal, for example, can be positioned between the access cover 403 and the housing 401.

The access cover 403 further includes multiple inlet tubes or contaminant separator tubes 460 extending from an inner surface of the cover 403 toward the inner area of the housing 401. The tubes 460 can be sized to project at least 40 mm or more than 60 mm from an inner surface of the access cover 403 and into the housing body, although larger or smaller lengths are contemplated. Tubes 460 can be preformed and press-fit into apertures in the cover 403 during assembly, or can be attached in another way (e.g., with adhesive). In general, each separator tube 460 includes an upstream inlet end 462, into which unfiltered air entering the air cleaner assembly 400 passes. Each tube 460 can include a vane arrangement in or adjacent to the inlet end 462, and is configured to import and direct a cyclonic flow for the inlet air. The tubes 460 also include an opposite end 463 spaced from inlet end 462. Each separator tube 460 further includes a side slot 464 between the ends 462, 463 through which contaminant (dust, particulate contamination ejector or water) that is separated by the contaminant separator arrangement can exit for eventual ejection through housing contamination ejection port 426, which is described above relative to FIGS. 4 and 5.

Although a number of arrangements of the tubes 460 are contemplated, an exemplary embodiment includes tubes 460 arranged in rows that each include two tubes along the length of the access cover 403, with each row of tubes 460 being offset at least slightly from each adjacent row of tubes 460 (see FIG. 8, for example). As shown in this exemplary embodiment of an access cover 403, each row of tubes 460 is offset so that the centerline of each of the tubes of one row falls at approximately the center of the space between two tubes in an adjacent row of tubes; however, a larger or smaller amount of offset is also contemplated. Some or all of the tubes 460 also can include an arrangement of vanes that are used to direct the air flow in a desired manner. The arrangement of vanes can vary considerably, depending on the desired air flow, and it is contemplated that tubes 460 of a single access cover 403 can have different vane arrangements.

With regard to exemplary vane arrangements, it is understood that each tube 460 can operate with a centrifugal separation of contaminant conducted internally. To accomplish this, the air entering the inlet ends 462 of tubes 460 can be generally directed into a cyclonic pattern by the vanes. Side slot(s) 464 of each tube 460 can be an arcuate opening in a sidewall portion adjacent to and spaced from end 463 of each tube 460. The size and shape of the side slots 464 are generally selected to provide for maximum efficiency of operation. The end 463 of each tube 460 can be understood to be a cyclonic outlet, and swirling material will generally exit in a right angle direction relative to a center of the associated slot.

In order to achieve efficient separation of contaminant from the incoming contaminated air in the illustrated orientation of the air cleaner assembly 400, the tubes 460 are installed with their associated slots 464 positioned to generally direct the contaminant toward the outer walls, so that it will eventually move downwardly toward the evacuation port 426. To accomplish this, it is contemplated to orient the tubes 460 on one side of the access cover 403 differently than the tubes 460 on the other side of the access cover 403 (e.g., the tubes closer to the left versus. the tubes closer to the right in FIG. 8). In one example, for the tubes 460 on the right, each outlet slot 464 can be directed away from the port 426, wherein the tubes 460 on the left can be oriented (centered) with their outlet slots 464 directed opposite or downwardly, i.e., toward port 426. However, if the air cleaner assembly 400 is differently oriented (e.g., at 90 degrees from that shown), the outlet slots 464 of the tubes 460 can instead all be directed toward the middle of the access cover 403.

The base member 412 of the precleaner 410 further includes a base plate 467 (indicated generally in FIG. 8) having multiple outlet tubes 468 extending therefrom. The outlet tubes 468 are positioned relative to the base plate 467 so that when the base member 412 and the access cover 403 are assembled to make up the precleaner 410, each of the outlet tubes 468 will extend into one of the inlet tubes 460.

The outlet tubes 468 may be molded or otherwise integrally formed with the base member 412, or can be separately made and then attached to the base plate 467.

Figure 12:
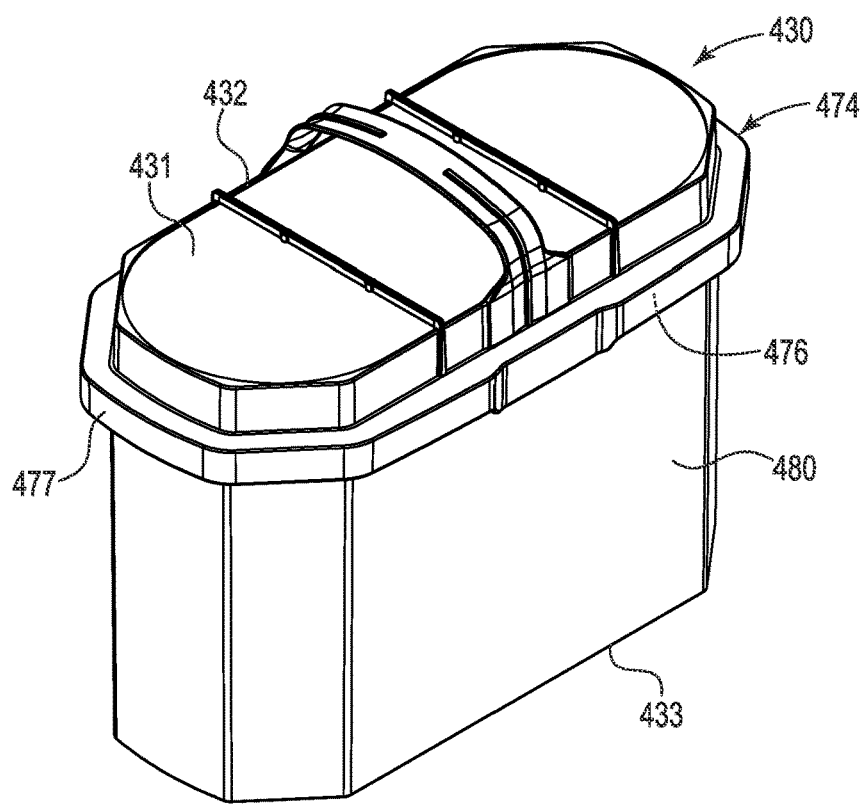
FIG. 12 is a perspective view of an exemplary filter cartridge of the invention for use in an air cleaner assembly.
Figure 13:
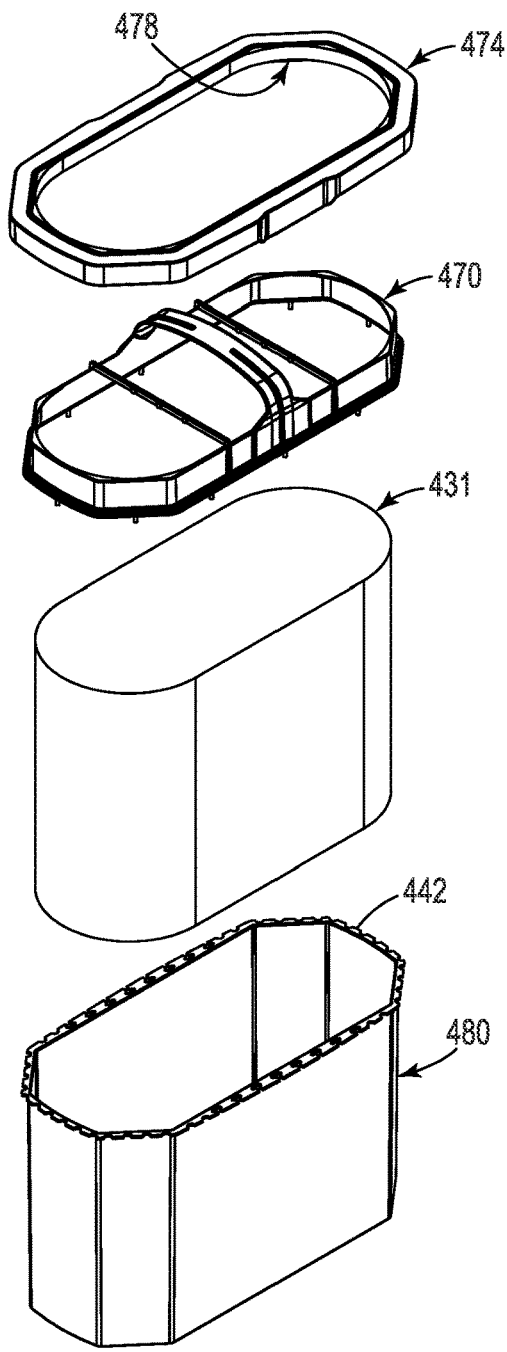
FIG. 13 is an exploded perspective view of the filter cartridge illustrated in FIG. 12.
Figure 14:
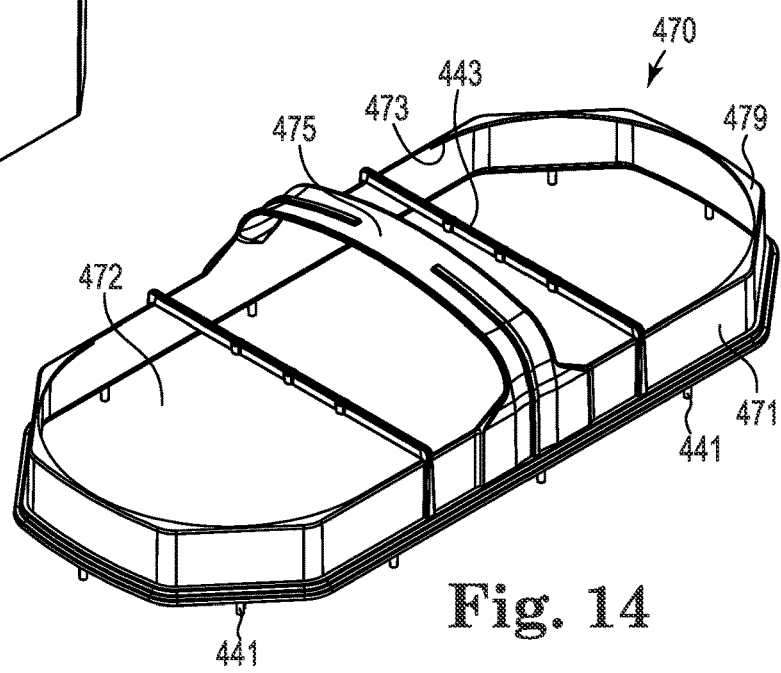
FIG. 14 is a perspective view of a filter sealing member of the filter cartridge of FIGS. 12 and 13.

Referring now to FIGS. 12 and 13, an exemplary embodiment of filter cartridge 430 of air cleaner assembly 400 is illustrated, with FIG. 14 further illustrating an enlarged view of a frame member 470 of the filter cartridge 430. The filter cartridge 430 can be considered to be the main or primary filter cartridge, and is used to selectively separate a desired amount of particulate or containment material that was not filtered out of the system by the precleaner 410. Cartridge 430 is generally a service part or removable component, such that it is periodically removable and replaceable as desired or necessary during the lifetime of the air cleaner 400. In particular, when the cartridge 430 becomes occluded or otherwise needs to be replaced, the access cover 403 is detached from the housing 401, the precleaner 410 is removed (if one is used), and the occluded filter 430 is removed. After such removal, a new filter 430 can be placed in the housing 401, or the filter 430 that was removed can be refurbished and replaced in its previous position within the housing 401. The precleaner 410 and/or cover 403 can then be repositioned and secured to the housing 401 so that the air cleaner assembly 400 is again ready for use.

As shown in the exploded view of FIG. 13, the filter cartridge 430 generally includes a media pack 431, a shell 480, a frame member 470, and a sealing member 474, which will generally be made of a relatively flexible material and may be referred to herein as a "flexible sealing member." When assembled, a lower portion of the media pack 431 is positioned within an inner opening of the shell 480, with a top portion of the media pack extending above the top surface of the shell 480. This top portion of the media pack 431 will then be positioned within an inner opening of the frame member 470, and then the flexible sealing member 474 will be formed to fill in spaces between the frame member 470 and the outer surface of the media pack 431 and to connect the frame member 470 to the shell 480 and the media pack 431, as will be described below. It is noted that while this figure illustrates the configuration in which the filter cartridge 430 includes both frame member 470 and shell 480, it is contemplated that only one of these two components 470, 480 may be provided for a particular embodiment of the filter cartridge of the invention, and that the below description contemplates all of these configurations.

The media pack 431 comprises filtration media that may be any of a variety of types, such as the fluted filter media described above, for example. In an exemplary embodiment, the filtration media is provided as an elongated sheet of filter media that is wrapped or coiled to provide an oblong or racetrack outer shape of a predetermined size for the media pack 431, as shown in FIG. 13. The amount of filtration media in a particular media pack is designed and selected to provide for certain filtration characteristics during the filtration process. For example, the filtration media may be tightly packed for greater density in certain applications, but may be more loosely wound in other applications.

Referring again to FIGS. 12 and 13, the depicted filter cartridge 430 includes an optional shell 480. Such a shell 480 surrounds the media pack 431 and protects the media during handling and use. The shell 480 can include a preformed molded plastic piece, for example, into which the media pack 431 is positioned during assembly of the cartridge 430. As shown, the outer surface of the shell 480 can have a shape that generally matches that of the outer shape of the frame member 470 (e.g., a racetrack oval), or it can instead have a different shape.

The exemplary cartridge 430 illustrated is considered to be a "straight through flow" arrangement in that it includes a first (inlet) flow face or end 432 and opposite outlet (flow) face or end 433, with filtering flow of air through the filter cartridge 430 generally being from the inlet end 432 to the outlet end 433. In more general terms, the main filter cartridge 430 includes permeable filtration media through which the air passes with filtering. In typical applications, the filter media will be configured in a media pack that conducts filtration of air, as the air passes in a flow direction from an inlet end of the filter media pack to an opposite outlet end of the filter media pack. Thus, in general, the filter cartridge 430 can be a straight-through flow construction in that air enters one end and exits the other without making a substantial turn within the media pack.

Frame member 470 includes a frame wall 471 having an outer shape that generally matches the inner peripheral shape of a housing wall of a housing in which it will be positioned. In this particular embodiment, the outer shape of the frame wall 471 is generally an elongated octagonal shape, although it is understood that the outer shape may be any desired polygonal shape that matches the inner shape of the housing wall. The frame member 470 further includes an inner opening 472 at its top edge defined by an upper lip 473 that extends inwardly from the frame wall 471 in at least one location to fill at least one gap space between the frame wall and the outer surface of the media pack when the media pack is positioned in the frame member 470. That is, because the shape of the frame wall 471 (e.g., an elongated octagon) is different from the outer shape of the media pack 431 (e.g., a racetrack oval), there will be gaps between these elements in the areas where the shapes diverge from each other (e.g., in the areas where the angled corners of the frame wall 471 are that are spaced from the curved outer surface of the filter cartridge 430). In this embodiment, extensions 479 of upper lip 473 from the frame wall 471 will fill in the gap to approximate an inner oblong or racetrack oval shape for the inner opening 472 of the filter sealing member along its top edge.

In other embodiments of the invention, the shape of the frame wall 471 is the same or nearly the same as the outer shape of the media pack 431. Because the same gap will not be present as that discussed above, the frame member will not have an upper lip that extends inwardly from the frame wall to fill such a gap space.

Frame member 470 further includes multiple stand-offs or extension members 441 extending from the bottom edge of the frame wall 471. Each of the stand-offs 441 extend from a the bottom edge of the frame wall 471 and have a distal end that will rest on a flange 442 that extends around at least a portion of the top edge of the shell 480, wherein the length of the stand-offs 441 corresponds to the distance that the bottom edge of the frame wall 471 will be spaced from the flange 442. The size, shape, and quantity of stand-offs can vary widely, and are generally selected to provide sufficient space between them through which a desired volume of sealing material can flow during manufacture and assembly of the flexible sealing member 474. Another consideration for the size, shape, and quantity of stand-offs is the desire to provide sufficient structural integrity to the system during and after manufacturing.

In an exemplary configuration, the number of stand-offs chosen will provide sufficient structural integrity to keep the frame wall 471 at a desired distance from the flange 442 during formation of the flexible sealing member 474, while allowing enough material to flow and form the flexible sealing member 474. In one embodiment, at least two stand-offs 441 are located along the straight edges of the frame wall 471, and at least one stand-off 441 is located along each of the angled edges of the frame wall 471. Further, the stand-offs or extension members 441 can have a length that provides for a gap greater than 2 mm from the flange 442, or can instead be less than 2 mm. In any case, the stand-offs or extension members 441 should be a size that allows for sufficient material flow during the manufacturing process, yet ensures that the frame member 470 is captured by the seal material.

Still referring to FIGS. 12-14, the illustrated filter cartridge 430 includes an optional handle 475 having ends that extend from opposite sides of the frame wall 471 and oriented adjacent the cartridge inlet end 432 and projecting therefrom in a direction away from the outlet end 433. This positions and orients the handle 475 so that it can be grasped by an operator to manage servicing of the cartridge 430. The particular handle 475 of this embodiment includes a central handle bridge structure defining a space through which a person's fingers can extend during grasping of the handle member 475. A variety of shapes, sizes and features for the optional handle 475 can be used. In addition, one or more optional additional support members 443 can be spaced from the handle 475 and extend across the opening in the frame wall 471 in the same general direction as the handle 475.

The exemplary filter cartridge 430 has a non-circular cross-sectional shape, as described above, although alternative shapes are possible. In many applications of the present techniques, the filter cartridge will have a cross-sectional shape with a long cross-sectional axis in a plane perpendicular to air flow, and a short axis perpendicular to the long axis and located along a mid-point of the layer axis, with the ratio of the length of the long axis to the short axis (at a location half-way along the length of the long axis) being at least 1.4. While alternatives are possible, such ratios will often be used for arrangements according to the present invention because they relate to an air cleaner having an overall profile that is relatively low in one cross-dimensional to an opposite cross-dimension. In an exemplary embodiment, the media pack is at least 100 mm long in extension between flow ends, and can be at least 250 mm long.

The flexible perimeter sealing member 474 of filter 430 extends generally around the perimeter of the shell 480 adjacent to the frame member 470. When the filter cartridge 430 is positioned within a housing, as described above, the sealing member 474 is configured and positioned to function as a pinch seal. Such a pinch seal extends around a perimeter of the cartridge 430 at a position so that it can be pinched between two housing components under sealing pressure during use. The illustrated sealing member 474 is sometimes referred to in the industry as an "axial" pinch seal, since it is configured for sealing pressure between two housing components to be applied in an axial direction (i.e., in a direction of extension of an axis extending through the media from its inlet end to its outlet end). Other types of seal arrangements can be used, however, with selected principles of the present invention.

In more particularity, the sealing member 474 is configured such that a channel 476 (see FIG. 12, for example) is provided between a portion of sealing member 474 and the shell 480, wherein the channel 476 is positioned to mate with inner lip 406 of housing 401. The channel 476 can be located between the shell 480 and an axially directed portion 477 of the sealing member 474. This portion 477 of the sealing member 474 is sized and shaped to provide a leak-resistant seal with the inner surface of housing 401 when the air cleaner assembly 400 is in operation. To facilitate this, the sealing member 474 can be a resilient material of a type typically used for such sealing purposes. One exemplary material from which the flexible sealing member can be made is a urethane molded to an appropriate hardness, such as to a shore A hardness of no greater than 22. The flexible sealing member 474 can be molded in place with the media pack 431 positioned inside the shell 480 and frame member 470 positioned in its desired configuration. As a result, the sealing member 474 will have embedded therein the frame wall 471 of the frame member 470.

With particular reference to FIG. 13, sealing member 474 includes a transition region 478 that includes a portion of its inner surface that takes the shape of the media pack 431 and a portion that takes the shape of the frame member 470 and/or the shell 480. Such an area provides the transition from one shape to another for this sealing member 474.

The axially directed portion 477 of sealing member 474 can be contoured around portions of its perimeter to provide for selective engagement with other portions of the housing 401. In particular, the axially directed portion 477 can be contoured to have "steps" around its perimeter, wherein these steps can be recessed and/or projecting relative to the areas between these steps, and can also project further toward the outlet 433 of the cartridge 430 than the remainder of the sealing member 474. Such step portions can vary widely, wherein exemplary configurations of these steps are described in WO 2014/210541, which is incorporated herein by reference in its entirety. In an exemplary embodiment of the invention, the same amount of material is used for each portion of the sealing member around its perimeter such that in areas where the step portions are thicker, the axial dimension is shorter. With such an exemplary embodiment, the opposite is also true in that in areas where the step portions are thinner, the axial dimension of the step portions will be longer.

In order to accommodate these steps of the sealing member 474, the channel or pocket 481 (see FIG. 11) between housing 401 and lip 406 can have portions that are more deep or shallow than other areas. In addition, as referred to above, the housing 401 includes an inner lip 406 extending around its perimeter and spaced from the inlet 402, and at least one protrusion 407 extending inwardly from the wall of the housing 401. Further to this construction, the protrusion(s) 407 of housing 401 can be arranged in various locations around the inner perimeter of the housing 401, and are generally positioned at least partially within the pocket or channel 481. The protrusion(s) 407 are each provided with a specific size, shape, and location to align with a corresponding feature or configuration of the sealing member 474, such as the stepped or contoured areas of the sealing member 474. It is contemplated that one or more protrusions 407 extend from opposite sides of the housing in a symmetric configuration (so that the corresponding filter cartridge with symmetric protrusions/recesses can be inserted in either of two orientations for seating within the channel 481) or in a non-symmetric configuration (so that the corresponding filter cartridge with non-symmetric protrusions/recesses can only be inserted in one orientation for seating within the channel 481).

With continued reference to FIG. 11, access cover 403 is secured to the outside of the housing 401, with a filter cartridge 430 and precleaner 410 positioned within the inner opening of the housing 401. The access cover 403 is configured so that when it is secured to the housing 401, the precleaner 410 will be pressed toward the filter cartridge 430. In this way, if the elements within the housing 401 are not yet seated in their final locations, the pressure of the precleaner structure will "push" the elements toward the outlet 405 and into their seated positions. For example, this movement can ensure that the channel 475 of the flexible sealing member 474 will seat properly with the inner lip 406 of the housing 401. In addition, when the components are positioned in their desired locations, a bottom edge 481 of the base member 412 will press against the flexible sealing member 474. With this positioning of the precleaner 410, it will effectively be "isolated" as a component that is independently sealable from contaminants via the seal 452 at one end of the precleaner and the bottom edge 481 of the base member in the area of the sealing member 474.

Figure 15:
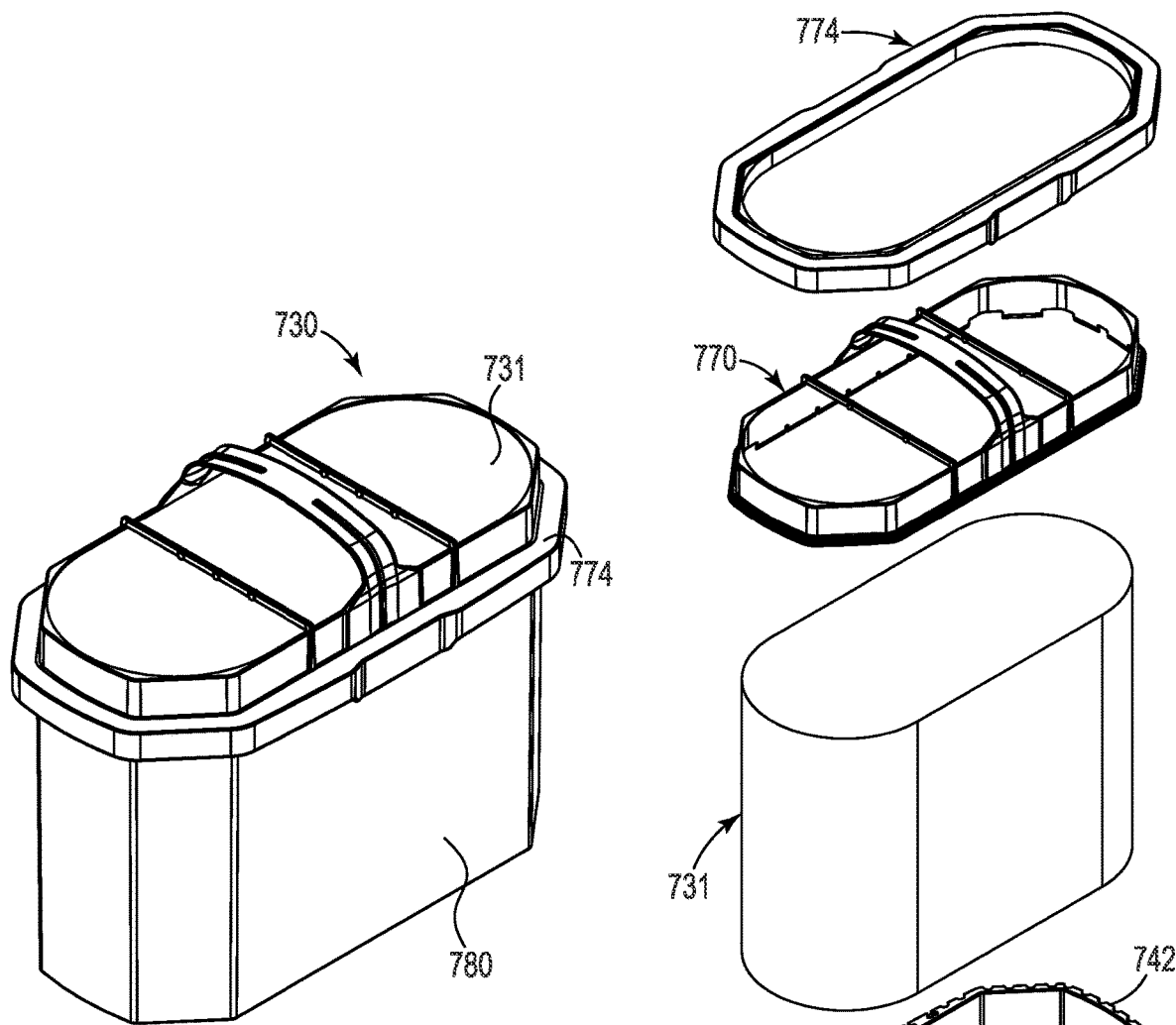
FIG. 15 is a perspective view of another exemplary filter cartridge of the invention for use in an air cleaner assembly.
Figure 16:
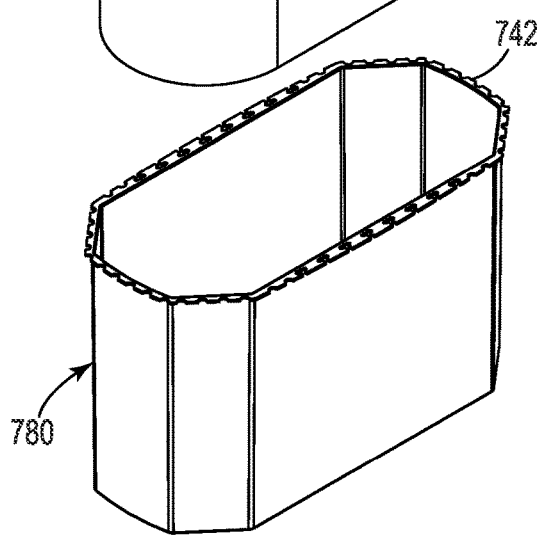
FIG. 16 is an exploded perspective view of the filter cartridge illustrated in FIG. 15.

Referring now to FIGS. 15 and 16, an exemplary embodiment of a filter cartridge 730 is illustrated, which is similar to the filter cartridge 430 discussed above, with FIG. 17 further illustrating an enlarged view of a frame member 770 of the filter cartridge 730. Thus, similar applications and structures described above relative to filter cartridge 430 may also apply to the filter cartridge 730.

As shown in the exploded view of FIG. 16, the filter cartridge 730 generally includes a media pack 731, a shell 780, a frame member 770, and a flexible sealing member 774. When assembled, a lower portion of the media pack 731 is positioned within an inner opening of the shell 780, with a top portion of the media pack extending above the top surface of the shell 780. This top portion of the media pack 731 will then be positioned within an inner opening of the frame member 770, and then the flexible sealing member 774 will be formed to fill in spaces between the frame member 770 and the outer surface of the media pack 731 and to connect the frame member 770 to the shell 780 and the media pack 731, as will be described below. It is noted that while this figure illustrates the configuration in which the filter cartridge 730 includes both frame member 770 and shell 780, it is contemplated that only one of these two components 770, 780 is provided for a particular embodiment of the filter cartridge of the invention, and that the below description contemplates all of these configurations.

Referring again to FIGS. 15 and 16, the depicted filter cartridge 730 includes an optional shell 780. Such a shell 780 surrounds the media pack 731 and protects the media during handling and use. The shell 780 can include a preformed molded plastic piece, for example, into which the media pack 731 is positioned during assembly of the cartridge 730. As shown, the outer surface of the shell 780 can have a shape that generally matches that of the outer shape of the frame member 770, or it can instead have a different shape.

Frame member 770 includes a frame wall 771 having an outer shape that generally matches the inner peripheral shape of a housing wall of a housing in which it will be positioned. In this particular embodiment, the outer shape of the frame wall 771 is generally an elongated octagonal shape. The frame member 770 further includes an inner opening 772 at its top edge defined by an upper lip 773 that extends inwardly from the frame wall 771 in at least one location to fill at least one gap space between the frame wall and the outer surface of the media pack when the media pack is positioned in the frame member 770. In this embodiment, extensions 779 of upper lip 773 from the frame wall 771 will fill in the gap to approximate an inner oblong or racetrack oval shape for the inner opening 772 of the filter sealing member along its top edge.

The frame wall 771 of frame member 770 can be solid around its perimeter, or can instead include notches or slots 741 at one or more locations around its perimeter. The size, shape, and quantity of notches or slots 741 can vary considerably, such in the range of between 1 mm and 20 mm. The size and shape of the slots or notches 741 can be chosen or designed depending on their positions relative to the media pack to provide control of the volume of sealing material of the flexible sealing member 774 that can flow during manufacture and assembly of the filter cartridge 730. In an exemplary embodiment, at least one notch is located along the straight edges of the frame wall 771, and at least one notch 741 is located along each of the angled edges of the frame wall 771.

It is understood that the size, shape, and placement of the slots or notches 741 for a particularly frame wall can include slots 741 that are all the same configuration as each other, can include slots that are all have different configurations, or can include some slots that have the same configurations and others that have different configurations. For instance, the slots 741 that are provided in the curved sections of a frame member can be larger or more numerous than those provided on the straight edges of the frame member 770. It is further contemplated that the spacing between adjacent slots 741 around the perimeter of the frame member 770 can be the same or different, depending on the desired flow of material that is being facilitated by these slots.

Figure 17:
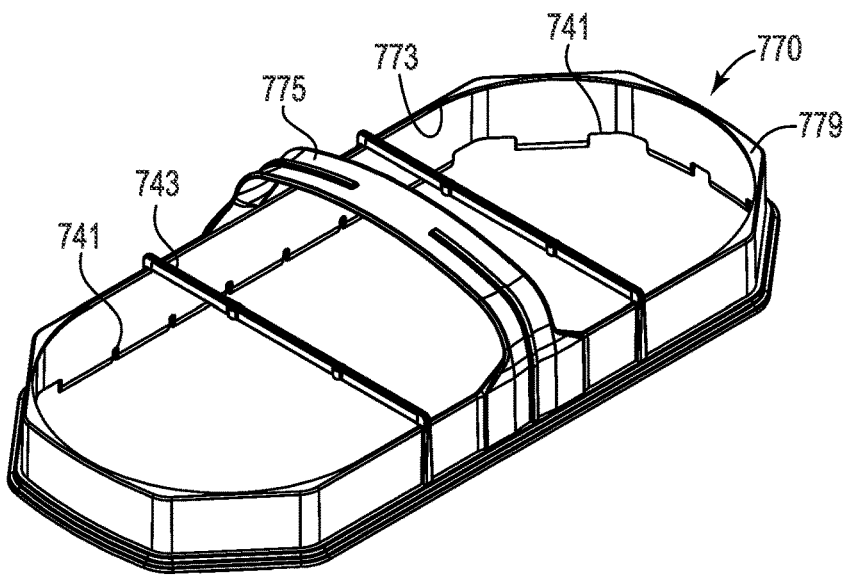
FIG. 17 is a perspective view of a filter sealing member of the filter cartridge of FIGS. 15 and 16.

Still referring to FIGS. 15-17, the illustrated filter cartridge 730 includes an optional handle 775 having ends that extend from opposite sides of the frame wall 771. A variety of shapes, sizes and features for the optional handle 775 can be used. In addition, one or more optional additional support members 743 can be spaced from the handle 775 and extend across the opening in the frame wall 771 in the same general direction as the handle 775.

The filter cartridge 730 further includes a flexible perimeter sealing member 774 extending generally around the perimeter of the shell 780 adjacent to the frame member 770. The filter cartridge 730 further includes a flexible perimeter sealing member 774 extending generally around the perimeter of the shell 780 adjacent to the frame member 770. When the filter cartridge 730 is positioned within a housing, as described above, the sealing member 774 is configured and positioned to function as a pinch seal. Such a pinch seal extends around a perimeter of the cartridge 730 at a position so that it can be pinched between two housing components under sealing pressure during use. The illustrated sealing member 774 is sometimes referred to in the industry as an "axial" pinch seal, since it is configured for sealing pressure between two housing components to be applied in an axial direction (i.e., in a direction of extension of an axis extending through the media from its inlet end to its outlet end). Other types of seal arrangements can be used, however, with selected principles of the present invention.

In more particularity, the sealing member 774 is configured such that a channel is provided between a portion of sealing member 774 and the shell 780, wherein the channel is positioned to mate with a portion of the housing in which it will be inserted. The flexible sealing member 774 can be molded in place with the media pack 731 positioned inside the shell 780 and frame member 770 positioned in its desired configuration. As a result, the sealing member 774 will have embedded therein the frame wall 771 of the frame member 770.

Referring again to the air cleaner assembly 400 illustrated in FIGS. 4 and 5, for example, it is noted that for desired sealing and placement of the components within the housing 401, the inner lip 406 is positioned at a distance from the inlet end 402 of the housing 401 so that certain components will be securely positioned and engaged with each other without undesirable spaces between the components. That is, for the air cleaner assembly 400 shown and described relative to FIG. 6, for example, the access cover 403 is part of precleaner 410, and thus the inner lip 406 is recessed sufficiently far to accommodate structure and operation of the precleaner 410. In general, the inner lip 406 will not be recessed further than an amount necessary to accommodate the various housing and inlet features and their operation. Although this is not a requirement with respect to operation of the air cleaner assembly, it is advantageous with respect to having the air cleaner housing 401 not be larger and heavier than necessary.

Figure 18:
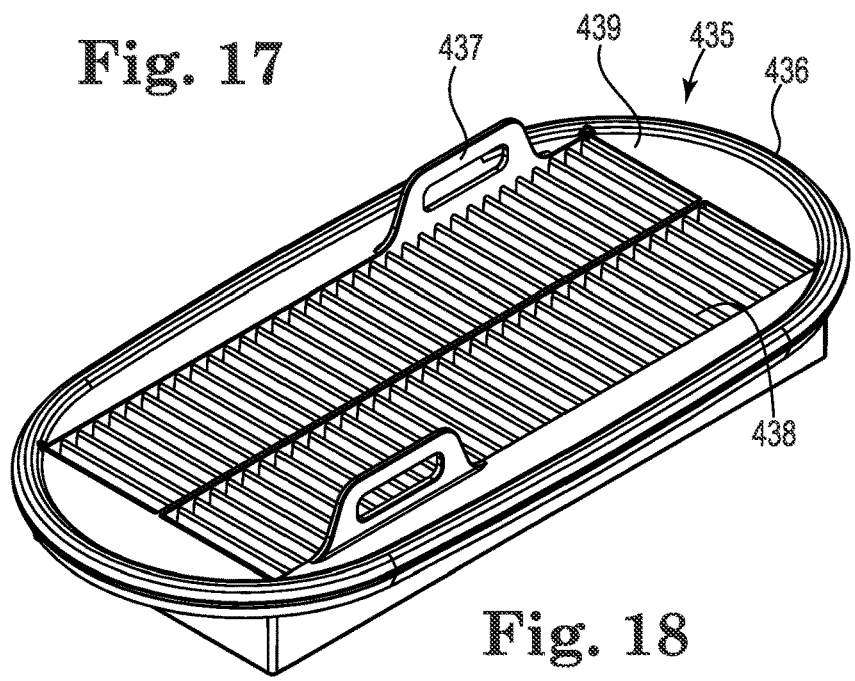
FIG. 18 is a perspective view of a safety filter element for use in an air cleaner assembly of the invention.
Figure 19:
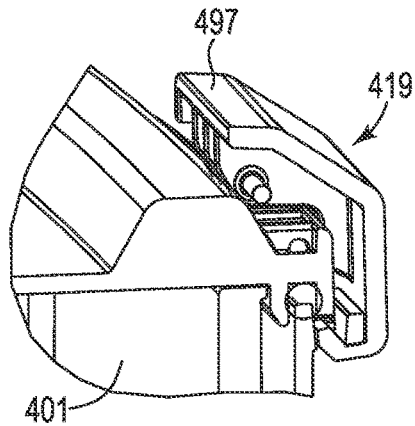
FIG. 19 is an enlarged perspective view of a latch of the access cover in a locked configuration relative to the air cleaner housing.
Figure 20:
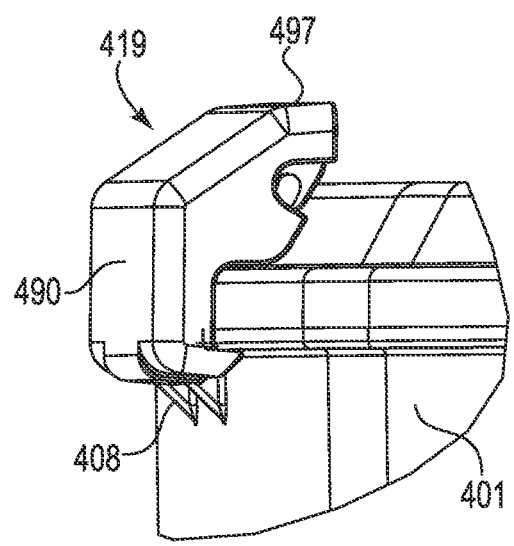
FIG. 20 is another perspective view of a latch of the access cover positioned relative to an air cleaner, illustrated from a different angle than FIG. 19.

Referring again to FIG. 6, the exemplary air cleaner assembly 400 includes an optional secondary or safety filter 435, which is also illustrated in FIG. 18. The safety filter 435 is generally positionable between the main filter cartridge 430 and the outlet 405 of the housing 401. In a typical arrangement, the safely filter 435 is removably positioned within the air cleaner assembly 400 and would also typically be considered to be a service component that is removable and replaceable, as desired and/or necessary. However, because the safety filter is typically not subject to very significant dust load in use, it is typically not replaced very frequently, and is instead more useful to provide additional protection from dust for the internal components, such as when the main filter cartridge 430 is removed from the housing 401.

The exemplary embodiment of safety filter 435 includes an outer frame 436 that generally matches the size and shape of the inner area of the housing 401 adjacent to the outlet 405, preferably with no gaps. In this way, the safety filter 435 can be pressed into the housing with a friction fit against the wall of the housing 401 so that no air can reach the outlet 405 without first going through the safety filter 435. Safety filter 435 further includes an upper face 439 from which at least one handle 437 extends. Each handle 437 provides an easy way for a user to remove the safety filter 435, in that each handle preferably includes an aperture or other feature that facilitates engagement by one or more fingers that can pull the safety filter 435 from the housing 401. Each handle 437 also helps to locate and position the filter cartridge 430 when it is inserted into the housing 401.

The safety filter 435 can further include multiple louvers 438 across at least a portion of the upper face 439, wherein such louvers 438 have slots between them through which air can enter the filter 435 and contact filter media (not visible). The filter media for this safety filter may be pleated media, with the pleats extending in a long dimension of the frame 436. The frame 436 may include pleat spacers to help maintain spacing integrity of adjacent pleats.

Figure 21:
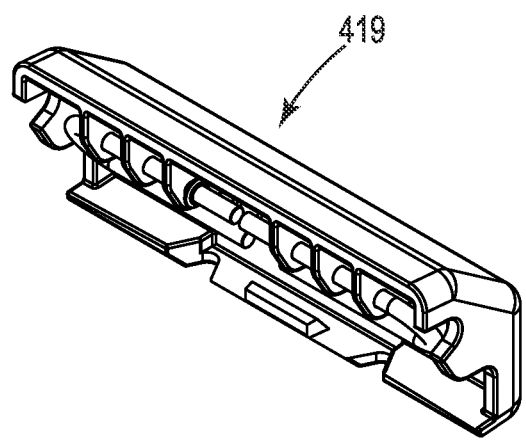
FIG. 21 is a perspective view of a latch of the type illustrated in FIGS. 19-20, in accordance with the invention.
Figure 22:
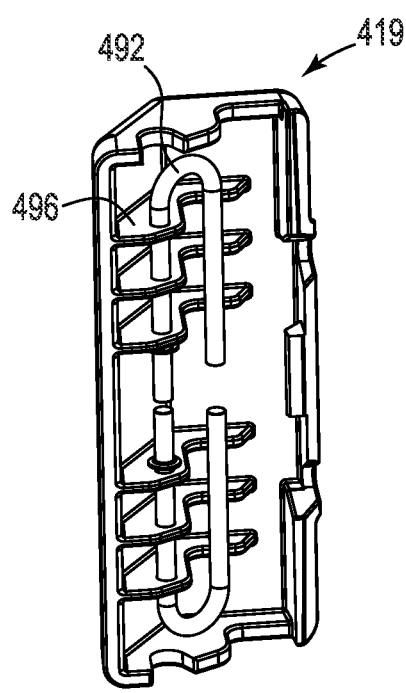
FIG. 22 is a bottom perspective view of the latch illustrated in FIGS. 19-21.
Figure 23:
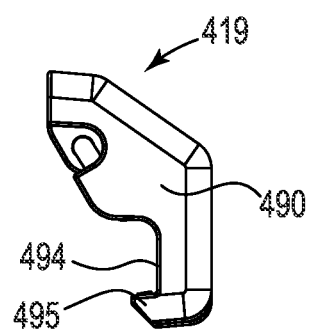
FIG. 23 is a side view of the latch illustrated in FIGS. 19-22.

As is discussed above, the access cover 403 is secured to the housing 401 via at least one latch 419, wherein latches 419 are shown in a number of the Figures as attached to securing members 408 extending from the outer surface of housing 401. Such attachments of a latch 419 to housing 401 are shown in enlarged views in FIGS. 19-20, and a single latch 419 is shown as a separate component from the access cover 403 in FIGS. 21-23.

Latch 419 includes a latch body 490 and multiple (e.g., two) u-shaped wire members 492 engaged within the latch body 490. Latch body 490 includes a number of contours for engagement with surfaces and features of the access cover 403 and the housing 401, such as a channel 494 having a lower lip 495. Channel 494 is configured to accept an edge of the access cover 403 along with securing member 408 of housing 401 to secure these components to each other. In particular, lip 495 is positionable under the securing member 408, and an upper area of the channel 494 will be adjacent to an upper surface of the access cover 403. Latch body 490 further includes a lower concave area in which a series of ribs 496 are spaced from each other. These ribs 496 can be molded into the latch body 490 or can be made separately and secured to the latch body 490. Each of the ribs 496 includes an aperture that is engageable with a straight portion of one of the u-shaped wire members 492. As shown, one of the straight portions of each of the wire members 492 is rotatably positioned within the apertures of the ribs 496, while the other straight portion of each of the wire members 492 is attached for pivoting/rotating movement with the access cover 403.

In order to secure the access cover 403 to the housing 401, the latches 419 are rotated away from the access cover 403 as the access cover 403 is pressed toward the inlet end 402 of housing 401. After the cover 403 is properly located, the lip 495 of channel 494 of each latch 419 is moved into engagement with one of the securing members 408 and rotated about the u-shaped wire members 492 with the securing member 408 and edge of the access cover 403 located within the channel 494. The top surface 497 is then pressed toward the top surface of the access cover until the latch 419 "snaps" into engagement with the access cover 403.

The filter cartridges of the invention can be configured to be positionable within the housing in one or more rotational orientations. With a cartridge of the type depicted, in which the cartridge has a long cross-sectional access and a short cross-sectional access, the cartridge can be configured to be positioned in only one appropriate rotational orientation, or can be configured to be properly positionable in two rotational orientations. An indexing arrangement can be used between the cartridge and the housing to accommodate either one rotational orientation or two, as may be desired.

Referring now to FIGS. 24 and 25, an exploded perspective view of another exemplary embodiment of the air cleaner assembly 600 of the invention is illustrated, which is differently shaped than other air cleaner assemblies described herein, but includes a number of the same or similar features as other embodiments. Air cleaner assembly 600 generally includes a housing 601, a precleaner 610, a filter cartridge 630, and an optional safety filter 635. As shown, the general outer shape of at least a portion of some of these components is an octagon, wherein each of the eight sides is approximately the same length, which provides for certain options for assembling the components with each other that are not otherwise available. For example, the filter cartridge 630 may have multiple orientations in which it can fit into the housing 601, as is discussed further below.

The exemplary housing 601 includes an inlet 602 at an opposite end from an outlet 605, wherein the elements of the system are insertable into the inlet 601 for assembling the air cleaner assembly 600. Housing 601 can further include an inner lip (not visible) extending around the perimeter and spaced from the inlet 602. In addition, housing 601 includes at least one securing member 608 on the outside of its outer wall and adjacent to the inlet 602, which is provided for engagement with a latching mechanism 619 of the precleaner 610. The inner lip of the housing 601 is positioned to provide one side of a channel or pocket, wherein the channel is also defined by the inner wall of the housing 601 and a bottom channel surface extending between the inner lip and the inner wall of the housing 601. The channel generally extends around the perimeter of the housing 601 to provide for sealing with a feature of the filter cartridge, as is described below.

The precleaner 610 can include an access cover that is engageable with a base member (along with being attachable to the housing 601 via latches), or the precleaner 610 can be generally a single-piece component that also includes latches. That is, in certain embodiments of the air cleaner assembly 600, the precleaner can include an access cover that is engaged with a base member via an attachment configuration, such as a snap-fit arrangement, to secure the two parts to each other as a single unit that is then attachable to the housing 601 via latches 619. In such an embodiment, the access cover would be separable from the base member to facilitate cleaning, for example. However, in another embodiment of the precleaner 610, the access cover can be made as a single piece that is provided to the assembly 600 as a single unit. In any case, the precleaner 610 is generally used to remove a portion of the dust or other particulate material (e.g., liquid particulate material) that enters the air cleaner through the air flow inlet before that material can reach internally positioned filter cartridge 630.

The precleaner 610 further includes multiple inlet tubes or contaminant separator tubes 660 extending from an inner surface of the cover toward the inner area of the housing 601. The tubes 660 can be preformed and press-fit into apertures in the cover during assembly, or can be attached in another way (e.g., with adhesive). In general, each separator tube 660 includes an upstream inlet end into which air (to be filtered) entering the air cleaner assembly 600 passes. Each tube 660 can include a vane arrangement in or adjacent to the inlet end, and is configured to import (direct) a cyclonic flow for the inlet air. Like other embodiments described herein, the tubes 660 can also include a side slot between the tube ends, through which contaminant (dust, particulate contamination ejector or water) that is separated by the contaminant separator arrangement can exit for eventual ejection through a housing contamination ejection port.

Although a number of arrangements of the tubes 660 are contemplated, an exemplary embodiment includes tubes 660 arranged in two intersecting or overlapping "rings" 662, 664, each of which includes two tubes at the top and bottom of the ring, and one tube at either side of the ring. The two bottom tubes of the first ring 662 are the same two tubes that make up the top two tubes of the second ring 664. As shown in this exemplary embodiment, the tubes 660 are preferably arranged so that a desired pattern is achieved for air exiting the tubes. Some or all of the tubes 660 also can include an arrangement of vanes that are used to direct the air flow in a desired manner. The arrangement of vanes can vary considerably, depending on the desired air flow, and it is contemplated that tubes 660 of a single precleaner 610 can have different vane arrangements.

Referring more particularly to FIG. 25, filter cartridge 630 can be considered to be the main or primary filter cartridge, and is used to selectively separate a desired amount of particulate or containment material that was not filtered out of the system by the precleaner 610. Cartridge 630 is generally a service part or removable component that is periodically removable and replaceable as desired or necessary during the lifetime of the air cleaner 600. The filter cartridge 630 comprises filter or filtration media 631 that may be any of a variety of types, such as the fluted filter media described above, for example. The exemplary cartridge 630 is considered to be a "straight through flow" arrangement in that it includes a first (inlet) flow face or end 632 and opposite outlet (flow) face or end 633, with filtering flow of air through the filter cartridge 630 generally being from the inlet end 632 to the outlet end 633.

The filter 630 may further include a filter sealing member (not visible) that has an inner opening at its top edge defined by an upper lip that extends inwardly from a frame wall in at least one location to fill at least one gap space between the frame wall and the outer surface of the media pack when the media pack is positioned in the filter sealing member. That is, because the shape of the frame wall (e.g., an octagon) is different from the outer shape of the filter cartridge 630 (e.g., a circle), there will be gaps between these elements in the areas where the shapes diverge from each other (e.g., where the angled corners of the frame wall are spaced from the curved outer surface of the filter cartridge 630). In this embodiment, extensions of upper lip from the frame wall will fill in the gap to approximate an inner octagon shape for the inner opening of the filter sealing member along its top edge.

The filter cartridge 630 further includes a flexible perimeter sealing member 674 extending generally around the perimeter of the top of the cartridge 630. The sealing member 674 further includes an axially directed portion 677 that is sized and shaped to provide a leak-resistant seal with the inner surface of housing 601 when the air cleaner assembly 600 is in operation. To facilitate this, the sealing member 674 can be a resilient material of a type typically used for such sealing purposes. The flexible sealing member 674 can be molded in place with the media 631 positioned inside of the shell of the cartridge 630 such that the sealing member 674 will have embedded therein the frame wall of the filter sealing member discussed above. When the cartridge 730 is positioned within a housing, its sealing member 674 can provide a pinch seal type of arrangement, as is discussed above relative to other configurations of cartridges.

The axially directed portion 677 of sealing member 674 can be contoured around portions of its perimeter to provide for selective engagement with other portions of the housing 601. In an embodiment of the filter cartridge 630, because all of the sides are of the sealing member 674 are the same length, the filter cartridge 630 can be "clocked" or rotated to any of eight different orientations within the housing 601. However, it is possible that the axially directed portion 677 on one or more of the sides includes contours or extensions that make the shape different from that of the other sides. In such an embodiment, the inner area of the housing 601 may be designed such that only certain orientations of the cartridge 630 will provide proper seating of the sealing member within the housing 601.

In accordance with the invention, it is contemplated that another exemplary air cleaner assembly does not include a precleaner that requires a contaminant ejection port, and therefore the air cleaner body can include a side air flow inlet rather than an end inlet. The outlet arrangement of such an embodiment could be made as a separate component from a remainder of the body and be secured thereto, or it can be molded integrally with a remainder of the body. In such an arrangement, the access cover will not be secured to a precleaner base member or body, but can instead be mounted directly to the housing. This access cover can be used to secure the filter cartridge within the housing.

The present invention has now been described with reference to several embodiments thereof. The entire disclosure of any patent or patent application identified herein is hereby incorporated by reference. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the structures described herein, but only by the structures described by the language of the claims and the equivalents of those structures.

What is claimed is:

1. A filter cartridge in combination with a housing, the filter cartridge configured to be removably positionable within an inner opening of the housing, wherein the filter cartridge comprises:
   a media pack comprising an inlet end, an outlet end, and an outer surface having an outer peripheral shape;
   a frame member at least partially surrounding the media pack, the frame member comprising a frame wall;
   a shell at least partially surrounding the media pack, the shell comprising a shell wall having a shape that is generally the same as the outer peripheral shape of the media pack; and
   a sealing member extending at least partially around the media pack, wherein the sealing member is spaced from the outlet end of the media pack; and
   wherein the housing comprises an inlet end, an outlet end, and an inner opening between the inlet and outlet ends defined by a housing wall having an inner peripheral shape that does not match an outer shape of the shell wall.

2. The combination of claim 1, wherein the shape of the shell wall is obround.

3. The combination of claim 1, wherein the frame wall comprises a shape that is different from the outer peripheral shape of the media pack.

4. The combination of claim 1, wherein the frame wall comprises a shape that is the same as the outer peripheral shape of the media pack.

5. The combination of claim 1, wherein the frame wall comprises a shape that is different from the shape of the shell wall.

6. The combination of claim 1, further comprising a handle extending across opposite sides of the frame wall.

7. The combination of claim 1, wherein the outer peripheral shape of the media pack comprises at least one curved portion.

8. The combination of claim 6, wherein the handle is oriented adjacent the inlet end and projects in a direction away from the outlet end.

9. The combination of claim 1, wherein the frame wall comprises an outer shape that generally matches the inner peripheral shape of the housing wall.

10. A filter cartridge in combination with a housing, the filter cartridge configured to be removably positionable within an inner opening of the housing, wherein the filter cartridge comprises:
    a media pack comprising an inlet end, an outlet end, and an outer surface with an obround shape;
    a frame member comprising a peripheral frame wall at least partially surrounding the media pack;
    a handle extending from opposite sides of the frame wall;
    a shell at least partially surrounding the media pack, the shell comprising a shell wall having an obround shape; and
    a sealing member extending at least partially around the media pack, the sealing member spaced from the outlet end of the media pack;
    wherein the housing comprises an inlet end, an outlet end, and an inner opening between the inlet and outlet ends defined by a housing wall having an inner peripheral shape that does not match the obround shape of the shell wall.

11. The filter cartridge of claim 10, wherein the frame wall has a polygonal shape.

12. The combination of claim 10, wherein the handle is oriented adjacent the inlet end and projects in a direction away from the outlet end.

13. The combination of claim 10, wherein the frame member comprises a frame wall having a shape that is different from the obround outer peripheral shape of the media pack.

14. The combination of claim 10, wherein the frame wall has an outer shape that generally matches the inner peripheral shape of the housing wall.

15. A filter cartridge configured to be removably positionable within an inner opening of a housing, wherein the filter cartridge comprises:
    a media pack comprising an inlet end, an outlet end, and an outer surface having an outer peripheral shape;
    a frame member at least partially surrounding the media pack, the frame member comprising a frame wall;
    a shell at least partially surrounding the media pack, the shell comprising a shell wall having a shape that is generally the same as the outer peripheral shape of the media pack; and
    a sealing member extending at least partially around the media pack, wherein the sealing member is spaced from the outlet end of the media pack; and
    wherein the frame wall comprises a shape that is different from the shape of the shell wall.

* * * * *